(12) United States Patent
Allen et al.

(10) Patent No.: US 7,034,927 B1
(45) Date of Patent: *Apr. 25, 2006

(54) SYSTEM AND METHOD FOR IDENTIFYING AN OBJECT USING INVISIBLE LIGHT

(75) Inventors: Paul G. Allen, Mercer Island, WA (US); James A. Billmaier, Woodinville, WA (US); Robert E. Novak, Santa Clara, CA (US); Matthew Regan, Glen Waverley (AU)

(73) Assignee: Digeo, Inc., Kirkland, WA (US)

( * ) Notice: Subject to any disclaimer, the term of this patent is extended or adjusted under 35 U.S.C. 154(b) by 435 days.

This patent is subject to a terminal disclaimer.

(21) Appl. No.: 10/186,296

(22) Filed: Jun. 28, 2002

(51) Int. Cl.
*G06K 9/74* (2006.01)

(52) U.S. Cl. ........................................... 356/71
(58) Field of Classification Search ............ 356/71, 356/3.1, 3.11, 3.12, 141.4, 141.5, 147, 15, 356/2.1, 620; 348/14.01–14.09, 164–172, 348/14.11–14.13, 33; 382/103
See application file for complete search history.

(56) References Cited

U.S. PATENT DOCUMENTS

| | | | | |
|---|---|---|---|---|
| 4,924,088 A | * | 5/1990 | Carman et al. | ............. 250/271 |
| 5,196,689 A | * | 3/1993 | Sugita et al. | ............ 250/206.1 |
| 5,332,176 A | | 7/1994 | Wootton et al. | ............ 244/3.11 |
| 5,341,186 A | | 8/1994 | Kato | .......................... 354/403 |
| 5,424,556 A | | 6/1995 | Symosek et al. | ........... 250/561 |
| 5,434,617 A | | 7/1995 | Bianchi | ...................... 348/170 |
| 5,668,629 A | | 9/1997 | Parker et al. | .......... 356/139.05 |
| 5,745,173 A | | 4/1998 | Edwards et al. | ............ 348/208 |
| 5,844,599 A | | 12/1998 | Hildin | ......................... 348/15 |
| 5,881,886 A | * | 3/1999 | Lawandy | ..................... 209/3.3 |
| 6,266,136 B1 | | 7/2001 | Ramer et al. | .......... 356/139.03 |
| 6,567,116 B1 | | 5/2003 | Aman et al. | ................. 348/169 |
| 2003/0095186 A1 | | 5/2003 | Aman et al. | ................. 348/162 |

OTHER PUBLICATIONS

Merging Real and Virtual Environments with Video See-Through Head-Mounted Displays by Michael A. Bajura; pp. 1-98; 1997.

Delayed Viewport Mapping and Priority Rendering for a Virtual Reality Display System by Matthew James Patrick Regan, Department of Computer Science, Monash University, Thesis Submitted for Examination for the Degree of Doctor of Philosophy 1995.

U.S. Appl. No. 10/186,244, filed Jun. 28, 2002, Allen et al.
U.S. Appl. No. 09/968,691, filed Oct. 1, 2001, Allen et al.

* cited by examiner

*Primary Examiner*—Tu T. Nguyen
(74) *Attorney, Agent, or Firm*—Kory D. Christensen; Stoel Rives LLP

(57) ABSTRACT

An object is identified with a camera that is sensitive to both visible and invisible light. An invisible light illuminator attached to the object may project a target of invisible light, which may either be generated by the illuminator or reflected from a separate invisible light source by the illuminator. The system processes the invisible light and identifies the object based on identity characteristics extracted from the invisible component. The system may then adapt its operation to settings associated with the object.

87 Claims, 19 Drawing Sheets

| ID Characteristic | Identity | Access Level | Status Level | Entertainment Preference | Thermostat Preference | Tracking Preference | Zooming Preference |
|---|---|---|---|---|---|---|---|
| Ellipse | Bob | Full | Call-in-Progress | TV News | 70 Degrees | Track Everywhere | Tight Zoom |
| Square | Duane | None | None | Classical Music | 65 Degrees | No Tracking | Wide Angle View |
| Hexagon | Bertha | Full | Dominant | Heavy Metal Music | 60 Degrees | Track only in Den | Medium Zoom |
| Double Ellipse | Helga | TV and Local Calls | Secondary | Cartoons | 80 Degrees | Track only in Playroom | Tight Zoom |

FIG. 16

SYSTEM AND METHOD FOR IDENTIFYING AN OBJECT USING INVISIBLE LIGHT

BACKGROUND

1. Field of the Invention

The present invention relates generally to the field of object identification. More specifically, the present invention relates to a system and method for automatically identifying an object with a camera that is sensitive to invisible light.

2. Description of Related Background Art

Many situations exist in which it is desirable to adapt an environment to suit the people or objects present in the environment. For example, when a person enters a room, the person may change thermostat temperatures, turn fans on or off, change television channels, initiate communication by telephone or videoconferencing systems, activate or deactivate security systems, and the like.

Videoconferencing is one situation in which environment customization is particularly desirable. Videoconferencing is rapidly becoming the communication method-of-choice for remote parties who wish to approximate face-to-face contact without the time and expense of travel. As bandwidth limitations cease to become a concern, a greater number of traditionally face-to-face events, such as business meetings, family discussions, and shopping, may be expected to take place through videoconferencing.

One of the most appealing aspects of face-to-face communication is that people are able to see each other's facial gestures and expressions. Such expressions lend an additional dimension to a conversation; this dimension cannot be conveyed through a solely auditory medium. Hence, videoconferencing is typically carried out with the camera zoomed in to focus on the subject's head.

In order to avoid restraining motion of the communicating person, it is desirable to provide a system in which the camera automatically pans and tilts to follow, or "track" the person. Furthermore, it is desirable to provide such a system with the ability to automatically zoom in on the person with the desired magnification level.

However, it may not be desirable to perform such tracking and zooming functions in the same manner for every user present in a room. More specifically, it may be advantageous for the system to track and zoom in on only the party presently involved with a videoconference. People may have different preferences regarding how tracking and zooming are to be carried out. For example, some users may desire that they be continuously kept within the field-of-view of the camera, while others prefer to disable tracking entirely so that they can move out of view.

Furthermore, other parameters of videoconferencing may depend upon the whereabouts of specific users. For example, in an area with multiple terminals (i.e., screen/camera combinations), it would be desirable to route communication to the terminal closest to the communicating person. Likewise, it may be desirable to vary system access, "caller ID," and other functions depending upon the identity of the communicating party.

In many situations, different users enter and leave an area frequently. As a result, people may not trouble themselves to adapt the area to their preferences each time they enter, simply because it is not worthwhile to do so. Thus, it would be desirable to have a system that automatically identifies users or objects present in the area and customizes the area accordingly.

Accordingly, what is needed is a system and method for identifying an object, such as a person, with a camera. Such a system and method should provide automatic identification so that various characteristics of the environment can be changed without requiring the attention of a user. Such a system and method may be usable in conjunction with videoconferencing systems to customize a videoconferencing system for a plurality of users. Additionally, such a system and method should be operable with comparatively simple equipment and procedures.

BRIEF DESCRIPTION OF THE DRAWINGS

Non-exhaustive embodiments of the invention are described with reference to the figures, in which:

FIG. 16 is a block diagram of a database containing identity characteristics, identities, and settings;

DETAILED DESCRIPTION OF THE PREFERRED EMBODIMENTS

Figure 1:
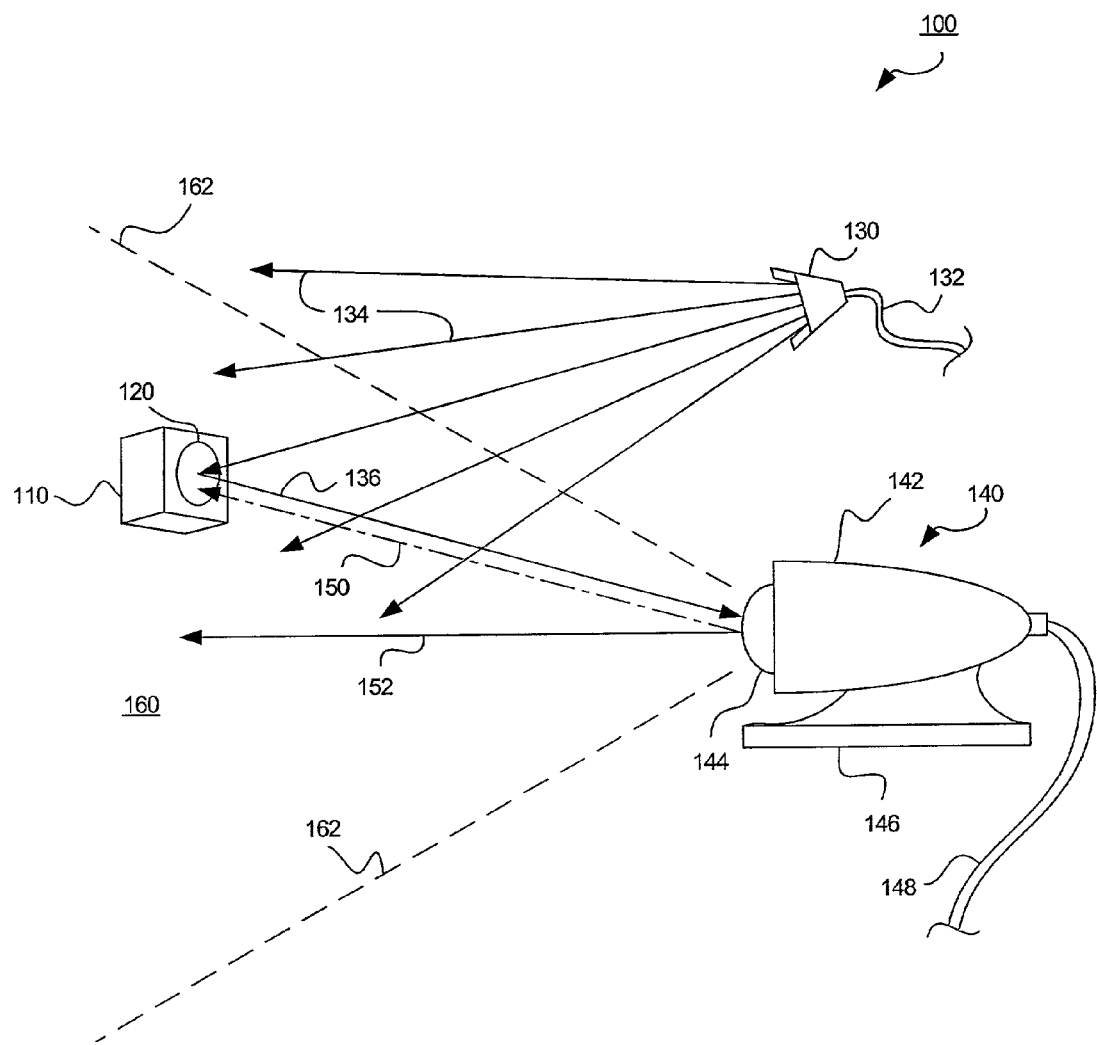
FIG. 1 is an illustration of a tracking system according to an embodiment of the invention.

The present invention solves the foregoing problems and disadvantages by providing a system and method for identifying objects with a camera using invisible light. Such a system and method may be utilized to provide customized videoconferencing. Of course, the described system and method are usable in a wide variety of other contexts, including security, manufacturing, law enforcement, and the like.

In one implementation, an illuminator that projects a form of invisible light, such as infrared light, is attached to an object to be tracked. Where the object is a person, such an illuminator may be attached (by an adhesive or the like) to an article worn by the person, such a pair of glasses, a shirt collar, a tie clip, etc. The illuminator may also be applied directly to the skin of the person.

The illuminator may be a reflector, such as a retro reflector, that simply reflects invisible light. A stationary invisible light emitter emits invisible light (such as infrared light) in the direction of the reflector. The invisible light is then reflected back to a camera that detects both visible and invisible light. In the alternative, the illuminator may be a portable invisible light emitter that generates its own invisible light. The camera provides a video signal with visible and invisible components.

A storage system may obtain information from a user, or from another source. The storage system may obtain identities of people or objects that may be present in the vicinity of the system. The storage system may also obtain associated identity characteristics for each identity, as well as settings according to which the system is to act in the presence of each identity. The identities, identity characteristics, and settings may be stored in a database for subsequent use.

An identification subsystem may utilize the invisible component. The identification subsystem may first extract all present identity characteristics from the invisible component. The identity characteristics are characteristics of the targets projected by the illuminators; the identity characteristics may include shapes, intensities, frequencies, wavelengths, and other characteristics of the invisible light received by the camera from the illuminators. The identification subsystem may then compare the identity characteristics with the database provided by the storage subsystem to determine which identities correspond with the identity characteristics, i.e., which identities are present within the field-of-view of the camera.

The identities may be conveyed to a setting control subsystem, which again references the database to determine which settings apply for each of the identities present. The setting control subsystem may transmit control signals to a tracking subsystem, a zoom subsystem, a video preparation subsystem, and/or a plurality of external devices such as thermostats and alarm systems. The tracking subsystem, zoom subsystem, video preparation subsystem, and external devices may thus operate according to the settings specified by the user to enable automated customization of the videoconferencing process and other processes.

The invisible component may also be utilized by the tracking subsystem to center the field-of-view of the camera on the illuminator. Centering may be accomplished with a mechanical camera by physically panning and tilting the camera until the illuminator is in the center of the field-of-view. The camera may alternatively be a software steerable type, in which case centering is accomplished by cropping the camera image such that the illuminator is in the center of the remaining portion.

The tracking component may mathematically determine the location of the illuminator and then align the center of the field-of-view with the illuminator. Alternatively, the tracking component may simply move the center of the field-of-view toward the illuminator in stepwise fashion until alignment has been achieved. The tracking subsystem may carry out tracking according to the settings pertaining to whichever identity or identities are involved in the conference call.

The zooming subsystem may utilize the invisible and/or the visible component to "zoom," or magnify, the field-of-view to reach a desired magnification level. As with tracking, such zooming may be accomplished mechanically or through software, using mathematical calculation and alignment or stepwise adjustment. Like tracking, zooming may be carried out according to the settings associated to the identity or identities involved in the conference call.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The following discussion makes particular reference to two-way video communication. However, those skilled in the art recognize that video communication typically includes two-way audio communication. Thus, where video communication and corresponding components are specifically illustrated, audio communication and corresponding components may be implied.

Referring to FIG. 1, one embodiment of a tracking system 100 according to the invention is shown. The object 110 may be inanimate, or may be a person, animal, or the like. The object 110 may have an invisible light illuminator 120, or illuminator 120, disposed on the object 110. As used herein, "invisible light" refers to electromagnetic energy with any frequency imperceptible to the human eye. Infrared light may advantageously be used due to the ease with which it can be generated and reflected; however, a wide variety of other electromagnetic spectra may also be utilized according to the invention, such as ultraviolet.

The illuminator 120 may take the form of a reflector that reflects invisible light generated by some other body. The illuminator 120 may consist, for example, of a solid body with a reflective side coated with or formed of a substance that reflects invisible light. Such a surface may be covered by glass or plastic that protects the surface and/or serves as a barrier to the transmission of electromagnetic energy of undesired frequencies, such as those of the visible spectrum. The illuminator 120 may have an adhesive surface facing opposite the reflective surface; the adhesive surface may be used to attach the illuminator 120 to the object 110. Of course, the illuminator 120 could also be attached to the object 110 using any other attachment method, including a clip, clamp, adhesive, magnet, pin, or the like.

In the alternative, the illuminator 120 may take the form of a portable emitter that actively generates invisible light.

Such an emitter may, for example, take the form of a specialized bulb, lens, or bulb/lens combination connected to a portable power source such as a battery. Such a portable emitter may then be used in much the same manner as a reflector, i.e., disposed on an object to permit tracking. The portable emitter may therefore have an adhesive or any other attachment mechanism.

In the event that the illuminator 120 is a reflector, a stationary invisible light emitter 130, or emitter 130, may be used to emit invisible light toward the object 110. The emitter 130 may be embodied, for example, as an infrared emitter, well known to those skilled in the art. As another example, the emitter 130 may take the form of an ultraviolet (UV) emitter.

The invisible light emitter 130 may receive electrical power through a power cord 132 or battery (not shown), and may project invisible light 134 over a broad angle so that the object 110 can move through a comparatively large space without the illuminator 120 passing beyond the illuminated space.

Conventional light sources, including natural and artificial lighting, are also present and project visible light that is reflected by the object 110. Such light sources are not illustrated in FIG. 1 to avoid obscuring aspects of the invention.

A portion 136 of the invisible light 134 may be reflected by the illuminator 120 to reach a camera 140. In one embodiment, the camera 140 is sensitive to both visible light and invisible light of the frequency reflected by the illuminator 120. The camera 140 may have a housing 142 that contains and protects the internal components of the camera 140, a lens 144 through which the portion 136 of the invisible light 134 is able to enter the housing 142, a base 146 that supports the housing 142, and an output cord 148 through which a video signal is provided by the camera 140. Of course, the camera 140 may be configured in other ways without departing from the spirit of the invention. For instance, the camera 140 may lack a separate housing and may be integrated with another device, such as a set top box (STB) for an interactive television system.

The video signal produced by the camera 140 may simply include a static image, or may include real-time video motion suitable for videoconferencing. The video signal may also include audio information, and may have a visible component derived from visible light received by the camera 140 as well as an invisible component derived from the portion 136 of the invisible light 134.

The object 110 may have a vector 150 with respect to the camera 140. The vector 150 is depicted as an arrow pointing from the camera 140 to the object 110, with a length equal to the distance between the object 110 and the camera 140. A center vector 152 points directly outward from the camera 140, into the center of a field-of-view 160 of the camera 140.

The field-of-view 160 of the camera 140 is simply the volume of space that is "visible" to the camera 140, or the volume that will be visible in an output image from the camera 140. The field-of-view 160 may be generally conical or pyramidal in shape. Thus, boundaries of the field-of-view 160 are indicated by dashed lines 162 that form a generally triangular cross section. The field-of-view 160 may be variable in size if the camera 140 has a "zoom," or magnification feature.

As described in greater detail below, the present invention provides a system and method by which the center vector 152 can be automatically aligned with the object vector 150. Such alignment may take place in real time, such that the field-of-view 160 of the camera 140 follows the object 110 as the object 110 moves. Optionally, the camera 140 may automatically zoom, or magnify, the object 110 within the field-of-view 160. The operation of these processes, and their effect on the visible output of the camera 140, will be shown and described in greater detail in connection with FIGS. 2 through 4.

Figure 2:
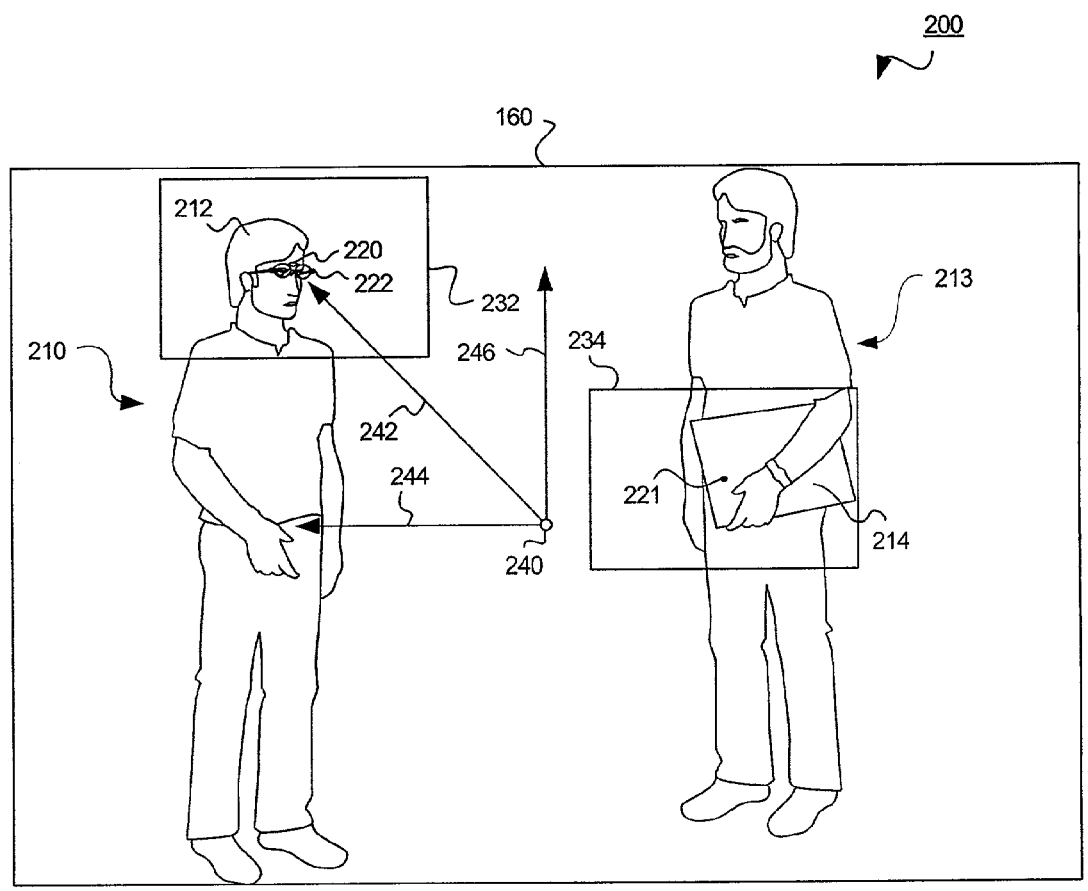
FIG. 2 is an illustration of a pre-tracking frame from the camera of FIG. 1.

Referring to FIG. 2, an exemplary pre-tracking view 200 of visible output, i.e., a display of the visible component of the video signal, is shown. Since the pre-tracking view 200 is taken from the point of view of the camera 140, a rectangular cross-sectional view of the field-of-view 160 is shown. The field-of-view 160 is thus assumed to be rectangular-pyramidal in shape; if the field-of-view 160 were conical, the view depicted in FIG. 2 would be circular.

In FIG. 2, a person 210 takes the place of the generalized object 110 of FIG. 1. The camera 140 may be configured to track the person 210, or if desired, a head 212 of the person, while the person 210 moves. A second person 213 is also present. The camera 140 may also be used to track an inanimate object such as a folder 214 held by the person 213. Illuminators 220, 221 may be attached to the person 210 and the folder 214, respectively, in order to facilitate tracking.

In the case of the person 210, the illuminator 220 may be affixed to an article worn by the person 210, such as a pair of glasses, a piece of jewelry, a tie clip, or the like. Like the illuminator 120 of FIG. 1, the illuminator 220 may have a reflective side and a non-reflective side that can be attached through the use of a clip, clamp, adhesive, magnet, pin, or the like. The illuminator 220 may then be affixed to an object such as a pair of glasses 222 or, in the alternative, directly to the person 210. The illuminator 221 may be easily affixed to the folder 214 in much the same fashion.

Indeed, if desired, an invisible light illuminator need not be a solid object, but may be a paint, makeup, or other coating applicable directly to an object or to the skin of the person 210. Such a coating need simply be formulated to reflect the proper frequency of invisible light. The coating may even be substantially transparent to visible light.

The person 210, or the head 212 of the person 210, may have a desired view 232, or an optimal alignment and magnification level for video communications. Similarly, the folder 214 may have a desired view 234. The illuminators 220, 221 may be positioned at the respective centers of the desired views 232, 234, so that the field-of-view 160 may be aligned with such a desired view.

Each of the illuminators 220, 221 provides a "target," or a bright spot within the invisible component of the video signal from the camera 140. Thus, each illuminator 220, 221 enables the camera 140 to determine the direction in which the associated object vector 150 points. Once the object vector 150 is determined, the tracking system 100 may proceed to align the object vector 150 with the center vector 152.

More specifically, a center 240 of the field-of-view 160 is an end view of the center vector 152 depicted in FIG. 1. In the view of FIG. 2, the illuminator 220 disposed on the person 210 is an end view of the object vector 150. Thus, "tracking," refers to motion of the field-of-view 160 until the center 240 is superimposed on the illuminator 220. Consequently, the center 240 is to be moved along a displacement 242 between the center 240 and the illuminator 220.

Such movement may be broken down into two separate dimensions: a pan displacement 244 and a tilt displacement 246. The pan displacement 244 represents the amount of "panning," or horizontal camera rotation, that would be required to align the center 240 with the illuminator 220. The tilt displacement 246 represents the amount of "tilting," or vertical camera rotation, that would be required to align the center 240 with the illuminator 220.

Panning and tilting may be carried out by physically moving the camera 140. More specifically, physical motion of the camera 140 may be carried out through the use of a camera alignment subsystem (not shown) that employs mechanical devices, such as rotary stepper motors. Two such motors may be used: one that pans the camera 140, and one that tilts the camera 140.

In the alternative, panning and tilting may be carried out by leaving the camera 140 stationary and modifying the video signal. For example, panning and tilting may be performed in conjunction with zooming by cropping the video signal. The video signal is obtained by capturing a second field-of-view (not shown) that covers a comparatively broad area. For example, a wide-angle, or "fish-eye" lens could be used for the lens 144 of the camera 140 to provide a wide second field-of-view. The first field-of-view 160 is then obtained by cropping the second field-of-view and correcting any distortion caused by the wide angle of the lens 144.

Panning and tilting without moving the camera 140 may be referred to as "software steerable" panning and tilting, although the subsystems that carry out the tracking may exist in software, hardware, firmware, or any combination thereof. Software steerable panning and tilting will be described in greater detail subsequently.

Figure 3:
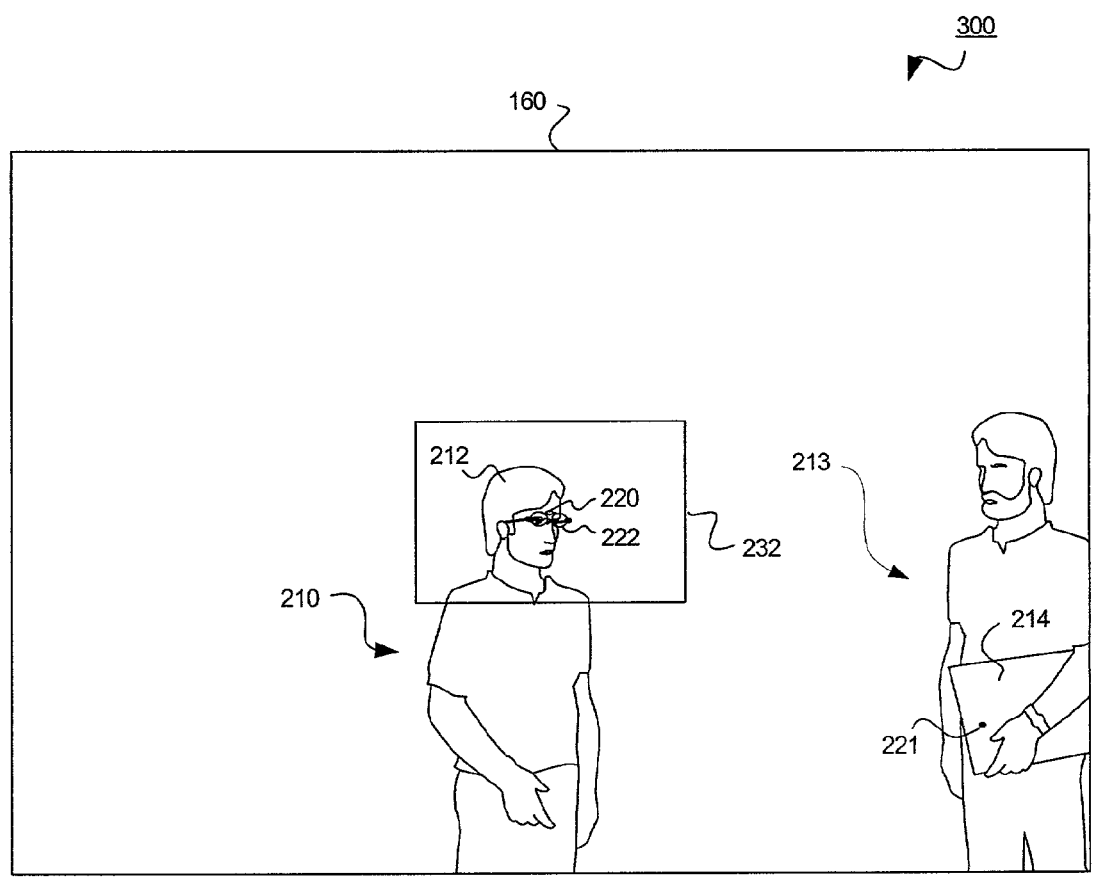
FIG. 3 is an illustration of a centered frame from the camera of FIG. 1.

Referring to FIG. 3, a centered view 300 of visible output from the camera 140 is shown. The field-of-view 160 has been panned and tilted through mechanical or software steerable processing such that the center 240 is aligned with the illuminator 220 on the person 210; consequently, tracking has been performed. The center 240 is not shown in FIG. 3 for purposes of clarity. The desired view 232 of the head 212 of the person 210 is now centered within the field-of-view 160. However, the field-of-view 160 has not been resized to match the desired view 232; hence, no zooming has occurred.

"Centering," as used herein, may not require precise positioning of the head within the center 240 of the field-of-view 160. In the view of FIG. 3, the head 212 is positioned slightly leftward of the center 240 of the field-of-view 160. This is due to the fact that the person 210 is not looking directly at the camera 140; hence, the illuminator 220 is disposed toward the right side of the head 212, from the perspective of the camera 140. Consequently, the illuminator 220 is disposed at the center 240 of the field-of-view 160, but the head 212 is slightly offset. Such offsetting is unlikely to seriously impede videoconferencing unless the field-of-view 160 is excessively narrow.

Figure 4A:
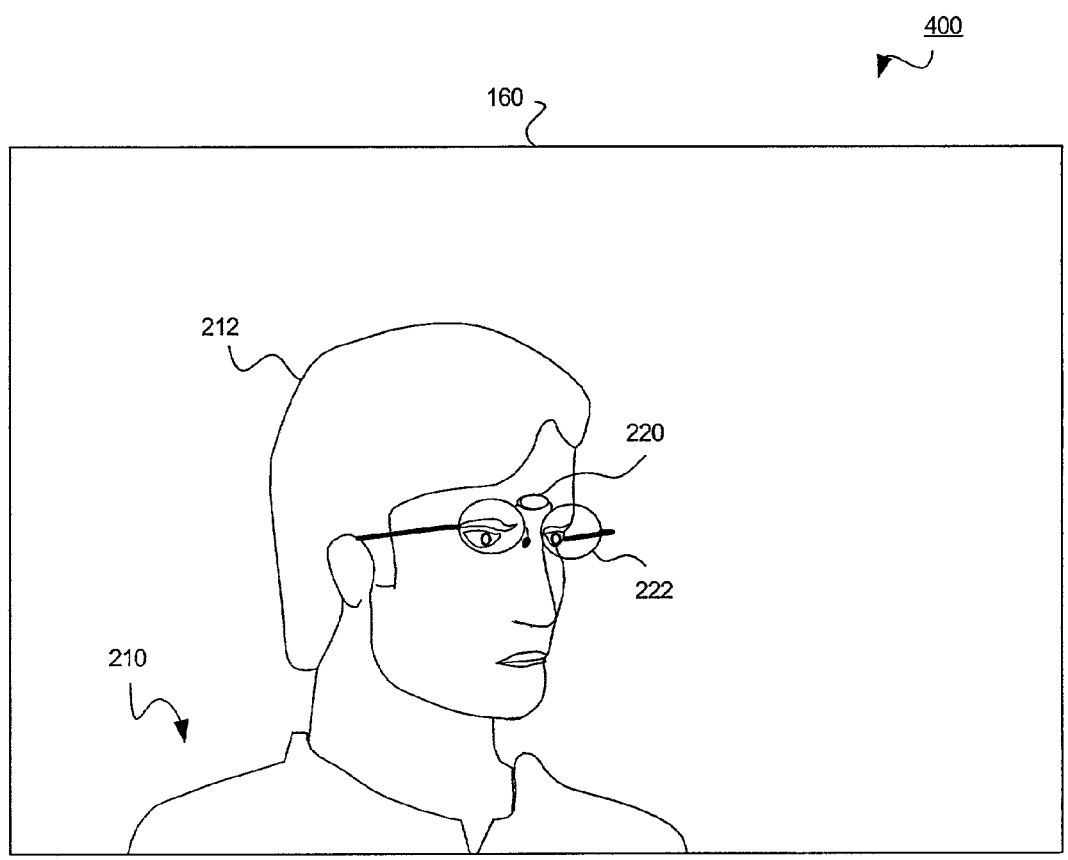
FIG. 4A is an illustration of a centered and zoomed frame from the camera of FIG. 1.

Referring to FIG. 4A, a zoomed and centered view 400 of visible output from the camera 140 is shown. The illuminator 220 is still centered within the field-of-view 160, and the field-of-view 160 has been collapsed to match the desired view 232, in which the head 212 appears large enough to read facial expressions during verbal communication with the person 210. Consequently, both tracking (centering) and zooming have been performed.

As with tracking, zooming may be performed mechanically, or "optically." Optical zooming typically entails moving the lens or lenses of the camera to change the size of the field-of-view 160. Additionally, lenses may be mechanically added, removed, or replaced to provide additional zooming capability.

In the alternative, zooming may also be performed through software. For example, an image may be cropped and scaled to effectively zoom in on the remaining portion. Such zooming may be referred to as software, or "digital" zooming.

The tracking and zooming functions have been illustrated as separate steps for clarity; however, tracking need not be carried out prior to zooming. Indeed, tracking and zooming may occur simultaneously in real-time as the person 210 moves within the field-of-view 160. The head 212 of the person 210 may thus be maintained continuously centered at the proper magnification level during video communication. The tracking system 100, or multiple such tracking systems, may be used in a wide variety of applications. As mentioned previously, videoconferencing is simply one application in which such tracking systems may find particular application.

Figure 4B:
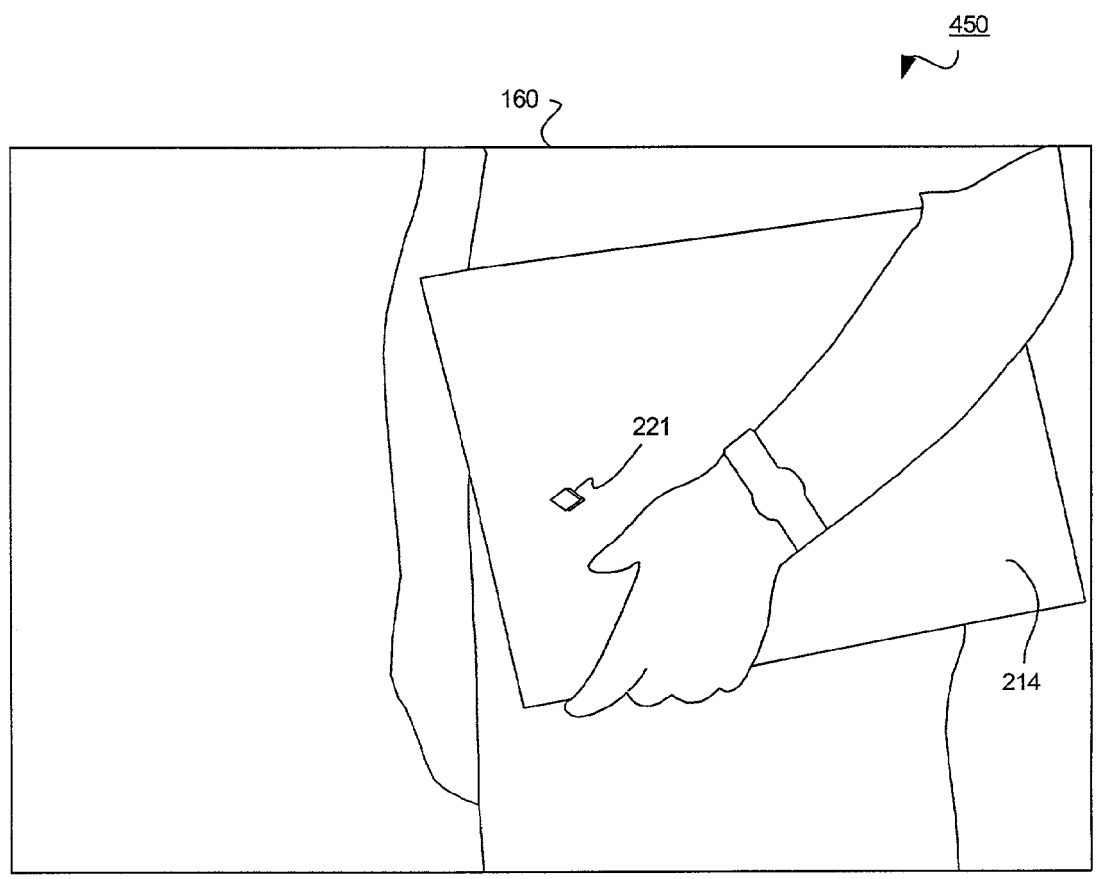
FIG. 4B is an illustration of another centered and zoomed frame of the camera of FIG. 1.

A similar process may be carried out with the folder 214, or with any other object with an illuminator 220 or 221 attached. FIG. 4B depicts the results of a similar process carried out with respect to the illuminator 221 attached to the folder 214.

Referring to FIG. 4B, a zoomed and centered view 450 of a different segment of visible output from the camera 140 is shown. The illuminator 221 is now centered within the field-of-view 160, and the field-of-view 160 has been collapsed to match the desired view 234 that contains the folder 214 with the illuminator 221. Once again, both tracking (centering) and zooming have been performed. Through the use of software steerable methods, the views of FIG. 4A and FIG. 4B may be simultaneously obtained from a single camera 140 by simply cropping different portions of the visible component.

As shown, the illuminator 221 has a diamond shape, which is distinct from the elliptical shape of the illuminator 220 depicted in FIG. 4A. Thus, the tracking system 100 may distinguish between the illuminators 220 and 221. Such identification is useful for a variety of reasons, which will be set forth in greater detail subsequently. The following discussion, with reference to FIG. 5 through FIG. 14, assumes that the head 212 of the person 210 is the object to be tracked.

Figure 5:
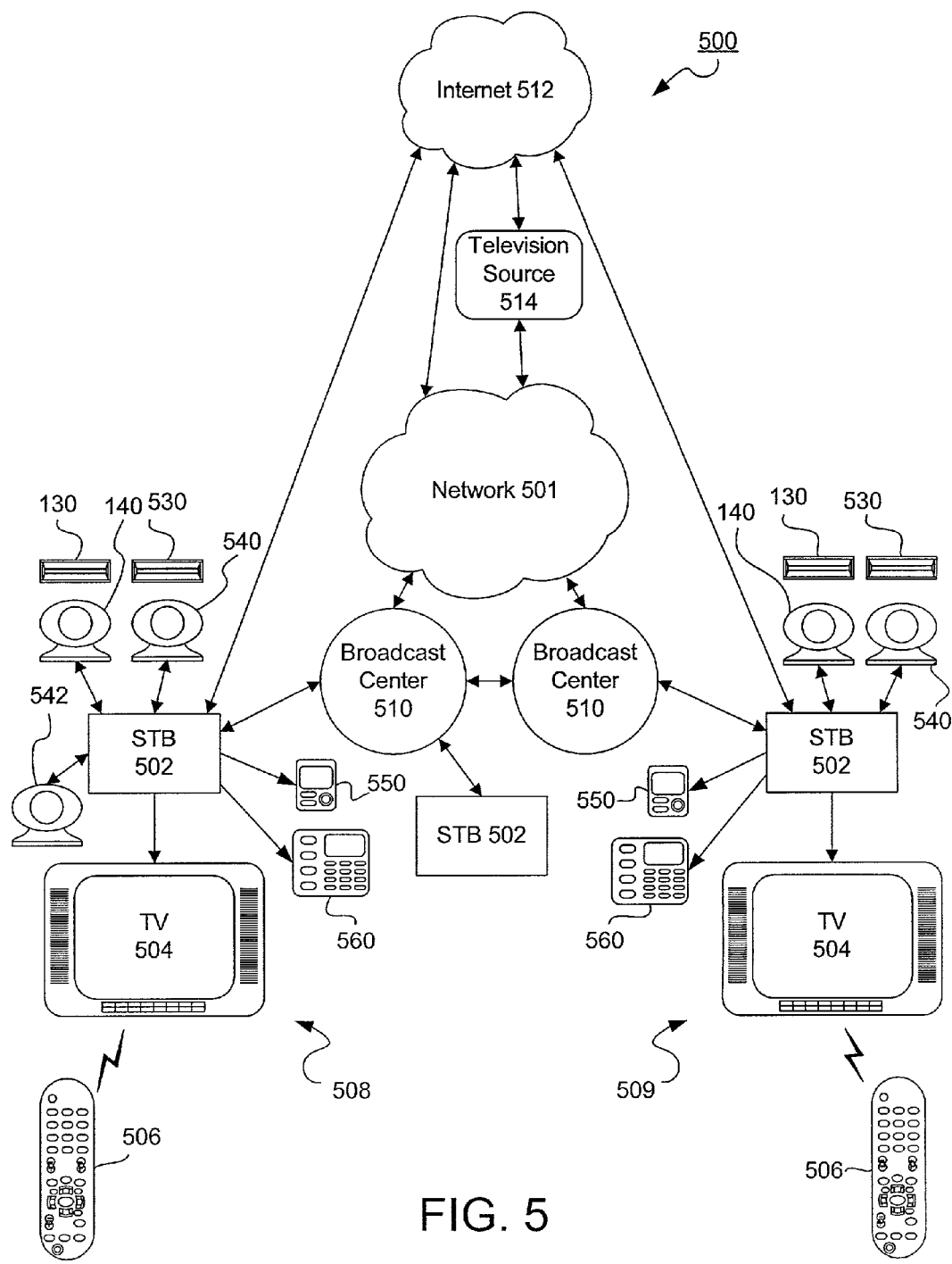
FIG. 5 is a schematic block diagram of one embodiment of a videoconferencing system in which the tracking system of FIG. 1 may be employed.

Referring to FIG. 5, one embodiment of a videoconferencing system 500 that may incorporate one or more tracking systems 100 is shown. In one implementation, the videoconferencing system 500 relies on a communication subsystem 501, or network 501, for communication. The network 501 may take the form of a cable network, direct satellite broadcast (DBS) network, or other communications network.

The videoconferencing system 500 may include a plurality of set top boxes (STBs) 502 located, for instance, at customer homes or offices. Generally, an STB 502 is a consumer electronics device that serves as a gateway between a customer's television 504 and the network 501. In alternative embodiments, an STB 502 may be embodied more generally as a personal computer (PC), an advanced television 504 with STB functionality, or other customer premises equipment (CPE).

An STB 502 receives encoded television signals and other information from the network 501 and decodes the same for display on the television 504 or other display device, such as a computer monitor, flat panel display, or the like. As its name implies, an STB 502 is typically located on top of, or in close proximity to, the television 504.

Each STB 502 may be distinguished from other network components by a unique identifier, number, code, or address, examples of which include an Internet Protocol (IP) address (e.g., an IPv6 address), a Media Access Control (MAC) address, or the like. Thus, video streams and other information may be transmitted from the network 501 to a specific STB 502 by specifying the corresponding address, after which the network 501 routes the transmission to its destination using conventional techniques.

A remote control 506 is provided, in one configuration, for convenient remote operation of the STB 502 and the television 504. The remote control 506 may use infrared (IR), radio frequency (RF), or other wireless technologies to transmit control signals to the STB 502 and the television 504. Other remote control devices are also contemplated, such as a wired or wireless mouse or keyboard (not shown).

For purposes of the following description, one STB 502, TV 504, remote control 506, camera 140, and emitter 130 combination is designated a local terminal 508, and another such combination is designated a remote terminal 509. Each of the terminals 508, 509 is designed to provide videoconferencing capability, i.e., video signal capture, transmission, reception, and display.

The components of the terminals 508, 509 may be as shown, or may be different, as will be appreciated by those of skill in the art. For example, the TVs 504 may be replaced by computer monitors, webpads, PDA's, computer screens, or the like. The remote controls 506 may enhance the convenience of the terminals 508, 509, but are not necessary for their operation. As mentioned previously, the STB 502 may be configured in a variety of different ways. The camera 140 and the emitter 130 may also be reconfigured or omitted, as will be described subsequently.

Each STB 502 may be coupled to the network 501 via a broadcast center 510. In the context of a cable network, a broadcast center 510 may be embodied as a "head-end", which is generally a centrally-located facility within a community where television programming is received from a local cable TV satellite downlink or other source and packaged together for transmission to customer homes. In one configuration, a head-end also functions as a Central Office (CO) in the telecommunication industry, routing video streams and other data to and from the various STBs 502 serviced thereby.

A broadcast center 510 may also be embodied as a satellite broadcast center within a direct broadcast satellite (DBS) system. A DBS system may utilize a small 18-inch satellite dish, which is an antenna for receiving a satellite broadcast signal. Each STB 502 may be integrated with a digital integrated receiver/decoder (IRD), which separates each channel, and decompresses and translates the digital signal from the satellite dish to be displayed by the television 504.

Programming for a DBS system may be distributed, for example, by multiple high-power satellites in geosynchronous orbit, each with multiple transponders. Compression (e.g., MPEG) may be used to increase the amount of programming that can be transmitted in the available bandwidth.

The broadcast centers 510 may be used to gather programming content, ensure its digital quality, and uplink the signal to the satellites. Programming may be received by the broadcast centers 510 from content providers (CNN®, ESPN®, HBO®, TBS®, etc.) via satellite, fiber optic cable and/or special digital tape. Satellite-delivered programming is typically immediately digitized, encrypted and uplinked to the orbiting satellites. The satellites retransmit the signal back down to every earth-station, e.g., every compatible DBS system receiver dish at customers' homes and businesses.

Some broadcast programs may be recorded on digital videotape in the broadcast center 510 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 501, the broadcast centers 510 may be coupled directly to one another or through the network 501. In alternative embodiments, broadcast centers 510 may be connected via a separate network, one particular example of which is the Internet 512. The Internet 512 is a "network of networks" and is well known to those skilled in the art. Communication over the Internet 512 is accomplished using standard protocols, such as TCP/IP (Transmission Control Protocol/Internet Protocol) and the like. If desired, each of the STBs 502 may also be connected directly to the Internet 512 by a dial-up connection, broadband connection, or the like.

A broadcast center 510 may receive television programming for distribution to the STBs 502 from one or more television programming sources 514 coupled to the network 501. Preferably, television programs are distributed in an encoded format, such as MPEG (Moving Picture Experts Group). Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG.

Broadcast centers 510 may be used to enable audio and video communications between STBs 502. Transmission between broadcast centers 510 may occur (i) via a direct peer-to-peer connection between broadcast centers 510, (ii) upstream from a first broadcast center 510 to the network 501 and then downstream to a second broadcast center 510, or (iii) via the Internet 512. For instance, a first STB 502 may send a video transmission upstream to a first broadcast center 510, then to a second broadcast center 510, and finally downstream to a second STB 502.

Each of a number of the STBs 502 may have a camera 140 connected to the STB 502 and an emitter 130 positioned in close proximity to the camera 140 to permit videoconferencing between users of the network 501. More specifically, each camera 140 may be used to provide a video signal of a user. Each video signal may be transmitted over the network 501 and displayed on the TV 504 of a different user. Thus, one-way or multiple-way communication may be carried out over the videoconferencing system 500, using the network 501.

If desired, each of the STBs 502 may form the hub of a multi-camera network. For example, a home or place of business may have a plurality of cameras positioned in different rooms, or with different fields-of-view within the same room. Separate stationary emitters may be provided if the illuminators used are reflectors. Hence, a second emitter 530 may be positioned in the vicinity of a second camera 540 connected to the STB 502. A third camera 542 may also be used. Indeed, it may be desirable to use more additional cameras, depending on the intended application and the size and layout of the place in which they will be used.

Furthermore, each of the STBs 502 may form a control center for various devices. For example, the STBs 502 may each be connected to implements such as a thermostat 550 and a security control panel 560 for an alarm system. Other devices, such as stereos, fans, humidifiers, automatic doors and windows, conventional telephones, computers, webpads, lights, space heaters, and appliances are not shown, but may also be connected to an STB 502. The present invention may utilize the cameras 140, 540, 542 to identify users and control such devices according to the whereabouts of each user. The identification and control aspects of the invention will be discussed in greater detail subsequently.

Of course, the videoconferencing system 500 illustrated in FIG. 5 is merely exemplary. Other types of devices and networks may be used within the scope of the invention.

Figure 6:
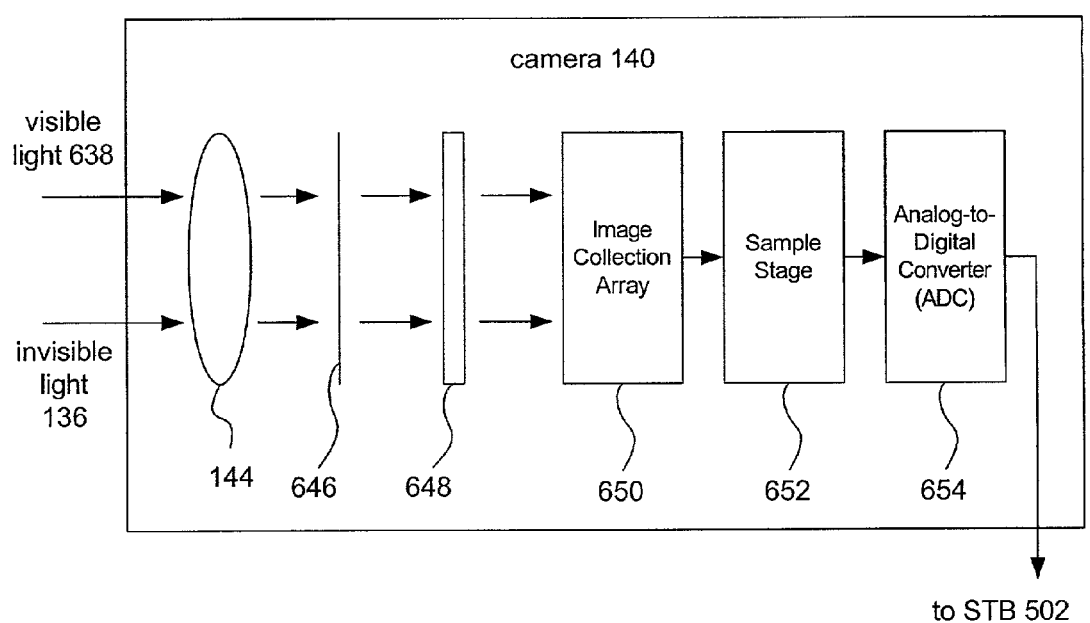
FIG. 6 is a schematic block diagram of the camera of FIG. 1.

Referring to FIG. 6, a block diagram shows one embodiment of a camera 140 according to the invention. The camera 140 may receive both visible and invisible light through the lens 144, and may process both types of light with a single set of hardware to provide the video signal. In addition to the lens 144, the camera 140 may include a shutter 646, a filter 648, an image collection array 650, a sample stage 652, and an analog-to-digital converter (ADC) 654.

As mentioned previously, if software steerable panning and tilting are to be utilized, the lens 144 may be a wide angle lens that has an angular field of, for example, 140 degrees. Using a wide angle lens allows the camera 140 to capture a larger image area than a conventional camera. The shutter 646 may open and close at a predetermined rate to allow the visible and invisible light into the interior of the camera 140 and onto the filter 648.

The filter 648 may allow the image collection array 650 to accurately capture different colors. The filter 648 may include a static filter such as a Bayer filter, or may utilize a dynamic filter such as a spinning disk filter. Alternatively, the filter 648 may be replaced with a beam splitter or other color differentiation device. As yet another alternative, the camera 140 may be made to operate without any filter or other color differentiation device.

The image collection array 650 may include a charge coupled device (CCD) sensors, complementary metal oxide semiconductor (CMOS) sensors, or other sensors that convert electromagnetic energy into readable image signals. If software steerable panning and tilting are to be used, the size of the image collection array 650 may be comparatively large such as, for example, 1024×768, 1200×768, or 2000× 1000. Such a large size permits the image collection array 650 to capture a large image to form the video signal from the comparatively large second field-of-view. The large image can then be cropped and/or distortion-corrected to provide the properly oriented first field-of-view 160 without producing an overly grainy or diminutive image.

The sample stage 652 may read the image data from the image collection array 650 when the shutter 646 is closed. The ADC 654 may then convert the image data from analog to digital form to provide the video signal ultimately output by the camera 140. The video signal may then be transmitted to the STB 502, for example, via the output cord 148 depicted in FIG. 1 for processing and/or transmission. In the alternative, the video signal may be processed entirely by components of the camera 140 and transmitted from the camera 140 directly to the network 501, the Internet 512, or other digital communication devices.

Those of skill in the art will recognize that a number of known components may also be used in conjunction with the camera 140. For purposes of explaining the functionality of the invention, such known components that may be included in the camera 140 have been omitted from the description and drawings.

Figure 7:
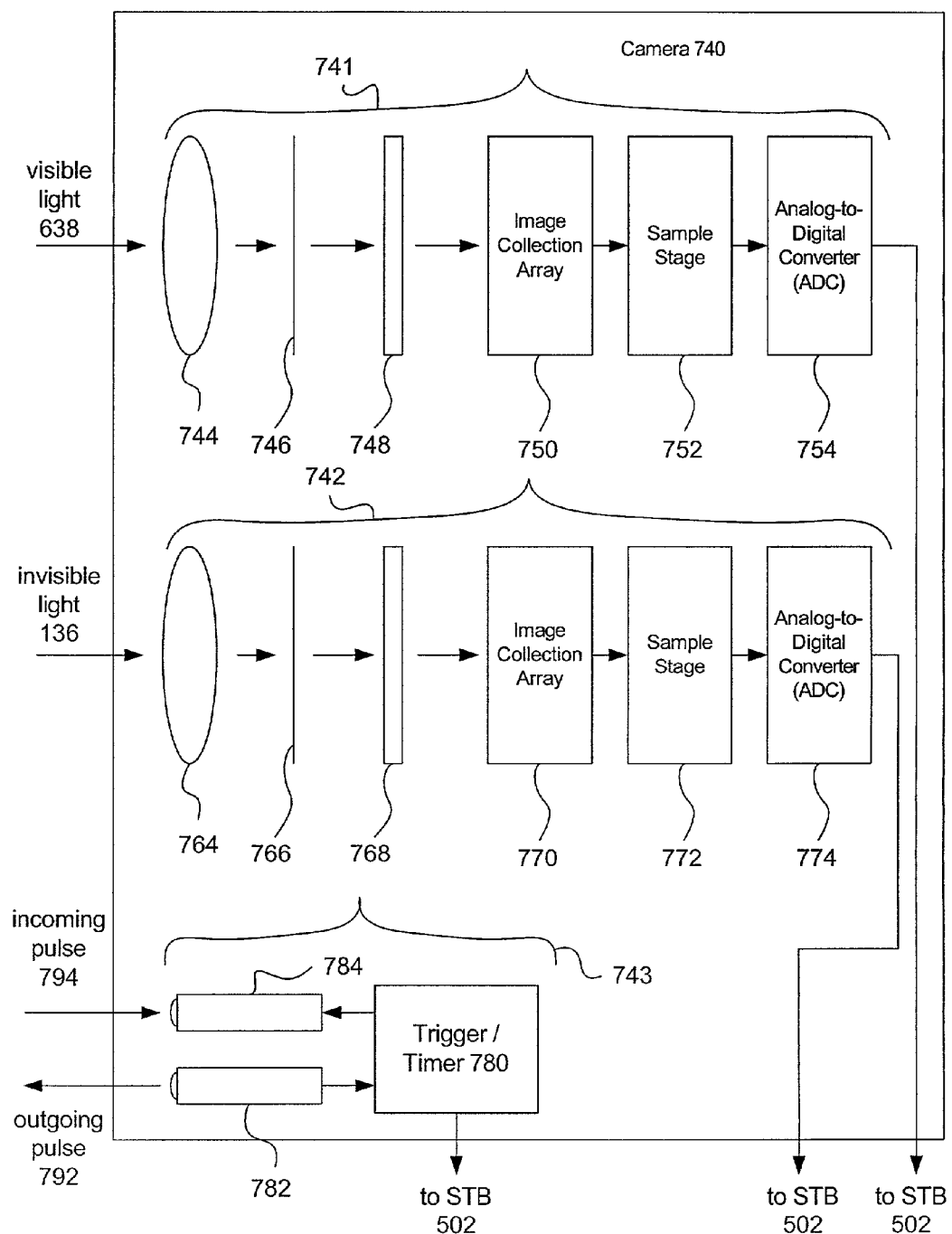
FIG. 7 is a schematic block diagram of another embodiment of a camera suitable for tracking.

Referring to FIG. 7, another embodiment of a camera 740 according to the invention is depicted. Rather than processing visible and invisible light simultaneously with a single set of hardware, the camera 740 may have a visible light assembly 741 that processes visible light and an invisible light assembly 742 that processes invisible light. The camera 740 may also have a range finding assembly 743 that determines the length of the object vector 150, which is the distance between the camera 140 and the person 210.

The visible light assembly 741 may have a lens 744, a shutter 746, a filter 748, an image collection array 750, a sample stage 752, and an analog-to-digital converter (ADC) 754. The various components of the visible light assembly 741 may be configured in a manner similar to the camera 140 of FIG. 6, except that the visible light assembly 741 need not process invisible light. If desired, the lens 744 may be made to block out a comparatively wide range of invisible light. Similarly, the image collection array 750 may record only visible light.

By the same token, the invisible light assembly 742 may have a lens 764, a shutter 766, a filter 768, an image collection array 770, a sample stage 772, and an analog-to-digital converter (ADC) 774 similar to those of the visible light assembly 741, but configured to receive invisible rather than visible light. Consequently, if desired, the lens 764 may be tinted, coated, or otherwise configured to block out all but the frequencies of light reflected by the illuminators 220, 221. Similarly, the image collection array 770 may record only the frequencies of light projected by the illuminators 220, 221.

Ultimately, the visible light assembly 741 may produce the visible component of the video signal, and the invisible light assembly 742 may produce the invisible component of the video signal. The visible and invisible components may then be delivered separately to the STB 502, as shown in FIG. 7, or merged within the camera 140 prior to delivery to the STB 502. The visible and invisible light assemblies 741, 742 need not be entirely separate as shown, but may utilize some common elements. For example, a single lens may be used to receive both visible and invisible light, while separate image collection arrays are used for visible and invisible light. Alternatively, a single image collection array may be used, but may be coupled to separate sample stages. Many similar variations may be made. As used herein, the term "camera" may refer to either the camera 140, the camera 740, or different variations thereof.

The range finding assembly 743 may have a trigger/timer 780 designed to initiate range finding and relay the results of range finding to the STB 502. The trigger/timer 780 may be coupled to a transmitter 782 and a receiver 784. When triggered by the trigger/timer 780, the transmitter 782 sends an outgoing pulse 792, such as an ultrasonic pulse, toward, for instance, the head 212 of the person 210. The outgoing pulse 792 bounces off the head 212 and returns in the form of an incoming pulse 794 that can be received by the receiver 784. The time-of-flight (TOF) for the pulses 792, 794 may be used in calculating the distance between the person 210 and the camera 740, which may be helpful in zooming the first field-of-view 160 to the proper magnification level to obtain the desired view 232. Ultrasonic distance sensors using multiple echo processing algorithms are well known in the art.

In an alternative embodiment, the illuminator 220 may be equipped with an ultrasonic transducer (not shown). An ultrasonic or optical (IR) signal may be sent by the camera 740 or the STB 502, which causes the transducer to emit a high frequency noise. The time delay between the transmission of the signal and the reception of the noise may be used to calculate the distance to the person 210. In still other embodiments, two cameras 140 may be used for distance calculation based on stereo convergence or other techniques understood by those skilled in the art.

Numerous other camera embodiments may be used according to the invention. Indeed, a more traditional analog camera may be used to read visible and invisible light. Such an analog camera may provide an analog video signal that can be subsequently digitized, or may include analog-to-digital conversion circuitry like the ADC 754 and the ADC 774. For the sake of brevity, the following discussion assumes the use of the camera 140.

If desired, the video signal may be processed outside the camera 140. If software steerable panning and tilting is utilized, such processing may include cropping and distortion correction of the video signal. If the camera 140 is used as part of a videoconferencing system like the videoconferencing system 500, the STB 502 may be a logical place in which to carry out such processing.

Figure 8:
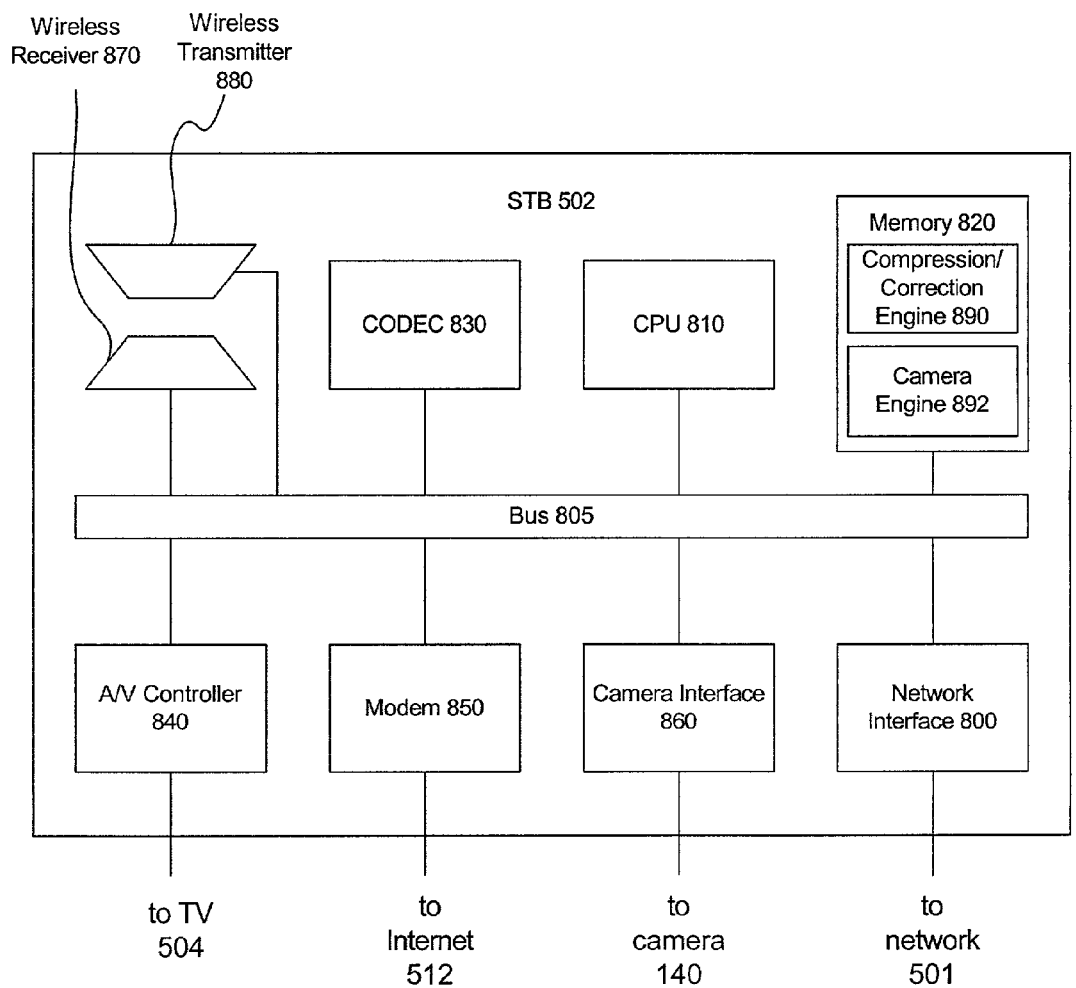
FIG. 8 is a schematic block diagram of one embodiment of a set top box usable in connection with the videoconferencing system of FIG. 5.

Referring to FIG. 8, there is shown a block diagram of physical components of an STB 502 according to an embodiment of the invention. The STB 502 may include a network interface 800 through which television signals, video signals, and other data may be received from the network 501 via one of the broadcast centers 510. The network interface 800 may include conventional tuning circuitry for receiving, demodulating, and demultiplexing MPEG-encoded television signals, e.g., digital cable or satellite TV signals. In certain embodiments, the network interface 800 may include analog tuning circuitry for tuning to analog television signals, e.g., analog cable TV signals.

The network interface 800 may also include conventional modern circuitry for sending or receiving data. For example, the network interface 800 may conform to the DOCSIS (Data Over Cable Service Interface Specification) or DAVIC (Digital Audio-Visual Council) cable modem standards. Of course, the network interface and tuning functions could be performed by separate components within the scope of the invention.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 501. Alternative ways to accomplish upstream transmission include using a back channel transmission, which is typically sent via an analog telephone line, ISDN, DSL, or other techniques.

A bus 805 may couple the network interface 800 to a processor 810, or CPU 810, as well as other components of the STB 502. The CPU 810 controls the operation of the STB 502, including the other components thereof. The CPU 810 may be embodied as a microprocessor, a microcontroller, a digital signal processor (DSP) or other device known in the art. For instance, the CPU 810 may be embodied as an Intel® x86 processor. The CPU 810 may perform logical and arithmetic operations based on program code stored within a memory 820.

The memory 820 may take the form of random access memory (RAM), for storing temporary data and/or read-only memory (ROM) for storing more permanent data such as fixed code and configuration information. The memory 820 may also include a mass storage device such as a hard disk drive (HDD) designed for high volume, nonvolatile data storage.

Such a mass storage device may be configured to store encoded television broadcasts and retrieve the same at a later time for display. In one embodiment, such a mass storage device may be used as a personal video recorder (PVR), enabling scheduled recording of television programs, pausing (buffering) live video, etc.

A mass storage device may also be used in various embodiments to store viewer preferences, parental lock settings, electronic program guide (EPG) data, passwords, e-mail messages, and the like. In one implementation, the memory 820 stores an operating system (OS) for the STB 502, such as Windows CE® or Linux®; such operating systems may be stored within ROM or a mass storage device.

The STB 502 also preferably includes a codec (encoder/decoder) 830, which serves to encode audio/video signals into a network-compatible data stream for transmission over the network 501. The codec 830 also serves to decode a network-compatible data stream received from the network 501. The codec 830 may be implemented in hardware, firmware, and/or software. Moreover, the codec 830 may use various algorithms, such as MPEG or Voice over IP (VoIP), for encoding and decoding.

In one embodiment, an audio/video (A/V) controller 840 is provided for converting digital audio/video signals into analog signals for playback/display on the television 504. The A/V controller 840 may be implemented using one or more physical devices, such as separate graphics and sound controllers. The A/V controller 840 may include graphics hardware for performing bit-block transfers (bit-blits) and other graphical operations for displaying a graphical user interface (GUI) on the television 504.

The STB 502 may also include a modem 850 by which the STB 502 is connected directly to the Internet 512. The modem 850 may be a dial-up modem connected to a standard telephone line, or may be a broadband connection such as cable, DSL, ISDN, or a wireless Internet service. The modem 850 may be used to send and receive various types of information, conduct videoconferencing without the network 501, or the like.

A camera interface 860 may be coupled to receive the video signal from the camera 140. The camera interface 860 may include, for example, a universal serial bus (USB) port, a parallel port, an infrared (IR) receiver, an IEEE 1394 ("firewire") port, or other suitable device for receiving data from the camera 140. The camera interface 860 may also include decoding and/or decompression circuitry that modifies the format of the video signal.

Additionally, the STB 502 may include a wireless receiver 870 for receiving control signals sent by the remote control 506 and a wireless transmitter 880 for transmitting signals, such as responses to user commands, to the remote control 506. The wireless receiver 870 and the wireless transmitter 880 may utilize infrared signals, radio signals, or any other electromagnetic emission.

A compression/correction engine 890 and a camera engine 892 may be stored in the memory 820. The compression/correction engine 890 may perform compression and distortion compensation on the video signal received from the camera 140. Such compensation may permit a wide-angle, highly distorted "fish-eye" image to be shown in an undistorted form. The camera engine 892 may accept and process user commands relating to the pan, tilt, and/or zoom functions of the camera 140. A user may, for example, select the object to be tracked, select the zoom level, or other parameters related to the operation of the tracking system 100.

Of course, FIG. 8 illustrates only one possible configuration of an STB 502. Those skilled in the art will recognize that various other architectures and components may be provided within the scope of the invention. In addition, various standard components are not illustrated in order to avoid obscuring aspects of the invention.

Figure 9:
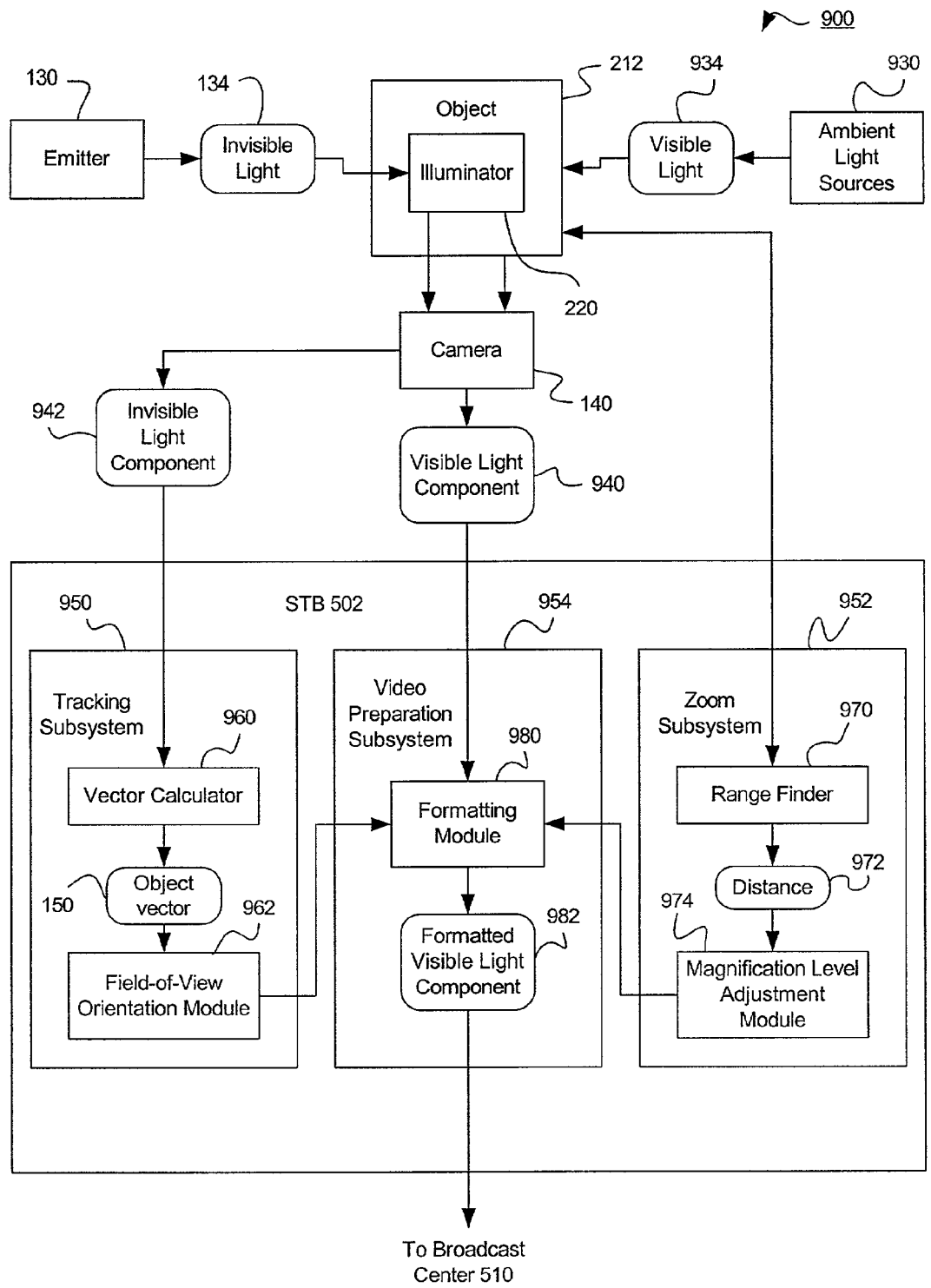
FIG. 9 is a logical block diagram depicting the operation of the tracking system of FIG. 1.

Referring to FIG. 9, a logical block diagram 900 shows one possible manner in which light and signals may interact in the tracking system 100 of FIG. 1. The illustrated steps/components may be implemented in hardware, software, or firmware, using any of the components of FIG. 8, alone or in combination. While various components are illustrated as being disposed within a STB 502, those skilled in the art will recognize that similar components may be included within the camera, itself.

As described previously, if the illuminator 220 is a reflector, the stationary emitter 130 emits invisible light 134 that is reflected by the illuminator 220. If the illuminator 220 is a portable emitter, the illuminator 220 may then generate invisible light independent of a stationary emitter. Ambient light sources 930 have not been shown in FIG. 1 for clarity; the ambient light sources 930 may include the sun, incandescent lights, fluorescent lights, or any other source that produces visible light 934. The visible light 934 reflects off of the object 212 (e.g., head), and possibly the illuminator 220.

Both visible and invisible light are reflected to the camera 140, which produces a video signal with a visible light component 940 and an invisible light component 942. The visible light component 940 and the invisible light component 942 are conveyed to the STB 502. If a camera such as the camera 740 is used, the camera 740 may also transmit the distance between the camera 740 and the object 212, which is determined by the range finding assembly 743, to the STB 502.

The invisible light component 942 may be processed by a tracking subsystem 950 that utilizes the invisible light component 942 to orient the field-of-view 160. For example, the tracking subsystem 950 may move the field-of-view 160 from that shown in FIG. 2 to that shown in FIG. 3.

The tracking subsystem 950 may have a vector calculator 960 that determines the direction in which the object vector 150 points. Such a determination may be relatively easily made, for example, by determining which pixels of the digitized invisible light component 942 contain the target reflected by the illuminator 220.

The vector calculator 960 may, for example, measure luminance values or the like to determine which pixels correspond to the illuminator 220. The target reflected by the illuminator 220 can be expected to be the brightest portion of the invisible component 942. The frequency and intensity of the invisible light emitted by the emitter 130 may be selected to ensure that the brightest invisible light received by the camera 140 is that reflected by the illuminator 220.

Alternatively, the field-of-view orientation module 962 may determine the location of the illuminator 220 through software such as an objectivication algorithm that analyzes motion of the illuminator 220 with respect to surrounding objects. Such an objectivication algorithm may separate the field-of-view 160 into "objects," or portions that appear to move together, and are therefore assumed to be part of a common solid body. Thus, the field-of-view orientation module 962 may resolve the illuminator 220 into such an object, and perform tracking based on that object. As one example, an algorithm such as MPEG-4 may be used.

In any case, the vector calculator 960 may provide the object vector 150 to a field-of-view orientation module 962.

The field-of-view orientation module 962 may then center the camera 140 on the object 212 (e.g., align the center vector 152 with the object vector 150).

Thus, the field-of-view orientation module 962 may perform the centering operation shown in FIG. 2 to align the center 240 of the field-of-view 160 with the target reflected by the illuminator 220. The field-of-view orientation module 962 may, for example, determine the magnitudes of the pan displacement 244 and the tilt displacement 246, and perform the operations necessary to pan and tilt the field-of-view 160 by the appropriate distances. As mentioned previously, panning and tilting may be performed mechanically, or through software.

The magnitudes of the pan and tilt displacements 244, 246 do not depend on the distance between the object 212 and the camera 140. Consequently, the tracking subsystem 950 need not determine how far the object 212 is from the camera 140 to carry out tracking. A two-dimensional object vector 150, i.e., a vector with an unspecified length, is sufficient for tracking.

As an alternative to the analytical tracking method described above, the tracking subsystem 950 may perform tracking through trial and error. For example, the tracking subsystem 950 need not determine the object vector 150, but may simply determine which direction the field-of-view 160 must move to bring the object 212 nearer the center 240. In other words, the tracking subsystem 950 need not determine the magnitudes of the pan and tilt displacements 244, 246, but may simply determine their directions, i.e., up or down and left or right. The field-of-view 160 may then be repeatedly panned and/or tilted by a preset or dynamically changing incremental displacement until the object 212 is centered within the field-of-view 160.

The STB 502 may also have a zoom subsystem 952 that widens or narrows the field-of-view 160 to the appropriate degree. The zoom subsystem 952 may, for example, modify the field-of-view 160 from that shown in FIG. 3 to that shown in FIG. 4.

Since the camera 140 shown in FIG. 9 does not have range finding hardware, the zoom subsystem 952 may have a range finder 970 that determines a distance 972 between the camera 140 (or the STB 502) and the object 212. The range finder 970 may be configured in a manner similar to the range finding assembly 743 of the camera 740, with a trigger/timer, transmitter, and receiver (not shown) that cooperate to send and receive an infrared or sonic pulse and determine the distance based on the lag between outgoing and incoming pulses.

If a camera with a range finding assembly 743 or other range finding hardware, such as the camera 740, were to be used in place of the camera 140, the STB 502 may not require a range finder 970. The tracking system 100 may alternatively determine the distance between the camera 140 and the object 212 through software such as an objectivication algorithm (e.g., as in MPEG4) that determines the size of the head 212 within the field-of-view 160 based on analyzing motion of the head 212 with respect to surrounding objects.

The distance 972 obtained by the range finder 970 may be conveyed to a magnification level adjustment module 974, which may use the distance 972 to zoom the field-of-view 160 to an appropriate magnification level. The magnification level may be fixed, intelligently determined by the magnification level subsystem 974, or selected by the user.

In any case, the magnification level may vary in real-time such that the object 212 always appears to be the same size within the field-of-view 160. Such zooming may be performed, for example, through the use of a simple linear mathematical relationship between the distance 972 and the size of the field-of-view 160. More specifically, the ratio of object size to field-of-view size may be kept constant.

For example, when the head 212 of the person 210 moves away from the camera 140, the magnification level adjustment module 974 may narrow the field-of-view 160 (e.g., "zoom in") so that the ratio of sizes between the head 212 and the field-of-view 160 remains the same. The field-of-view size refers to the size of the rectangular area processed by the camera, such as the views of FIG. 2, FIG. 3, and FIG. 4. If the head 212 moves toward the camera 140, the field-of-view 160 may be broadened (e.g., "zoomed out") to maintain the same ratio. Thus, the facial features of the person 210 will still be easily visible when the person 210 moves toward or away from the camera 140.

In the alternative to the analytical zooming method described above, zooming may also be performed through trial and error. For example, the magnification level adjustment module 974 may simply determine whether the field-of-view 160 is too large or too small. The field-of-view 160 may then be repeatedly broadened or narrowed by a preset increment until the field-of-view 160 is zoomed to the proper magnification level, i.e., until the ratio between the size of the object 212 and the size of the field-of-view 160 is as desired.

The visible light component 940 of the video signal from the camera 140 may be conveyed to a video preparation subsystem 954 of the STB 502. The video preparation subsystem 954 may have a formatting module 980 that transforms the visible light component 940 into a formatted visible component 982 suitable for transmission, for example, to the broadcast center 510 to which the STB 502 is connected. The formatted visible component 982 may also be displayed on the TV 504 connected to the STB 502, for example, if the person 210 wishes to verify that the camera 140 is tracking his or her head 212 properly.

The field-of-view orientation module 962 and the magnification level adjustment module 974 determine the orientation and zoom level of the formatted visible light component 982. In the case of mechanical panning, tilting, and zooming, the camera 140 may be controlled by the field-of-view orientation module 962 and the magnification level adjustment module 974. Thus, the visible light component 940 would already be properly oriented and zoomed.

However, the logical block diagram 900 of FIG. 9 assumes that panning, tilting, and zooming are managed through software. Thus, the field-of-view orientation module 962 and the magnification level adjustment module 974 may interact directly with the formatting module 980 to modify the visible light component 940. More specifically, the formatting module 980 may receive instructions from the field-of-view orientation module 962 and the magnification level adjustment module 974 to determine how to crop the visible light component 940. After cropping, the formatted visible light component 982 provides a centered and zoomed image.

The formatted visible component 982 may be conveyed over the network 501 to the remote terminal 509, which may take the form of another STB 502, TV 504, and/or camera 140 combination, as shown in FIG. 5. A user at the remote terminal 509 may view the formatted visible component 982, and may transmit a visible component of a second video signal captured by the remote terminal 509 back to the local terminal 508 for viewing on the TV 504 of the local terminal 508. Thus, the users of the local and remote terminals 508, 509 may carry out two-way videoconferencing through the use of the communication subsystem 501, or network 501.

If desired, software steerable technology may be used to provide a second formatted visible light component (not shown) of a different object. For example, the visible light component 940 of the video signal from the camera 140 may be cropped a first time to provide the desired view 232 of the head 212 of the person 210, as shown in FIG. 4. The desired view 232 may be formatted to form the formatted visible component 982. The visible light component 940 may be cropped a second time to provide the desired view 234 of the folder 214. The desired view 234 of the folder 214 may be formatted to form the second formatted visible light component 982.

In such a fashion, a plurality of additional cropped subsets of the visible light component 940 may be provided. Each cropped subset may be sent to a different remote terminal 509, for example, if multiple parties wished to see different parts of the view of FIG. 2. Thus, multiple objects can be tracked and conveyed over the network 501 with a single camera 140. Of course, one cropped subset could be displayed on the TV 504 of the local terminal 508 or recorded for future playback.

The tracking system 100 also may perform other functions aside from videoconferencing. For example, the tracking system 100 may be used to locate articles for a user. An illuminator 220 or 221 may be attached to a set of car keys, the remote control 506, or the like, so that a user can activate the tracking system 100 to track the car keys or the remote control 506.

An object may, alternatively, be equipped with an active emitter that generates invisible light that can be received by the camera 140. The remote control 506 may, for example, emit invisible light, either autonomously or in response to a user command, to trigger tracking and display of the current whereabouts of the remote control 506 on the TV 504.

An illuminator 220, 221 may also be disposed on a child to be watched by a parent or other caregiver. A user may then use the tracking system 100 to determine the current location of the child, and display the child's activities on the TV 504. Thus, the tracking system 100 can be used in a wide variety of situations besides traditional videoconferencing.

Figure 10:
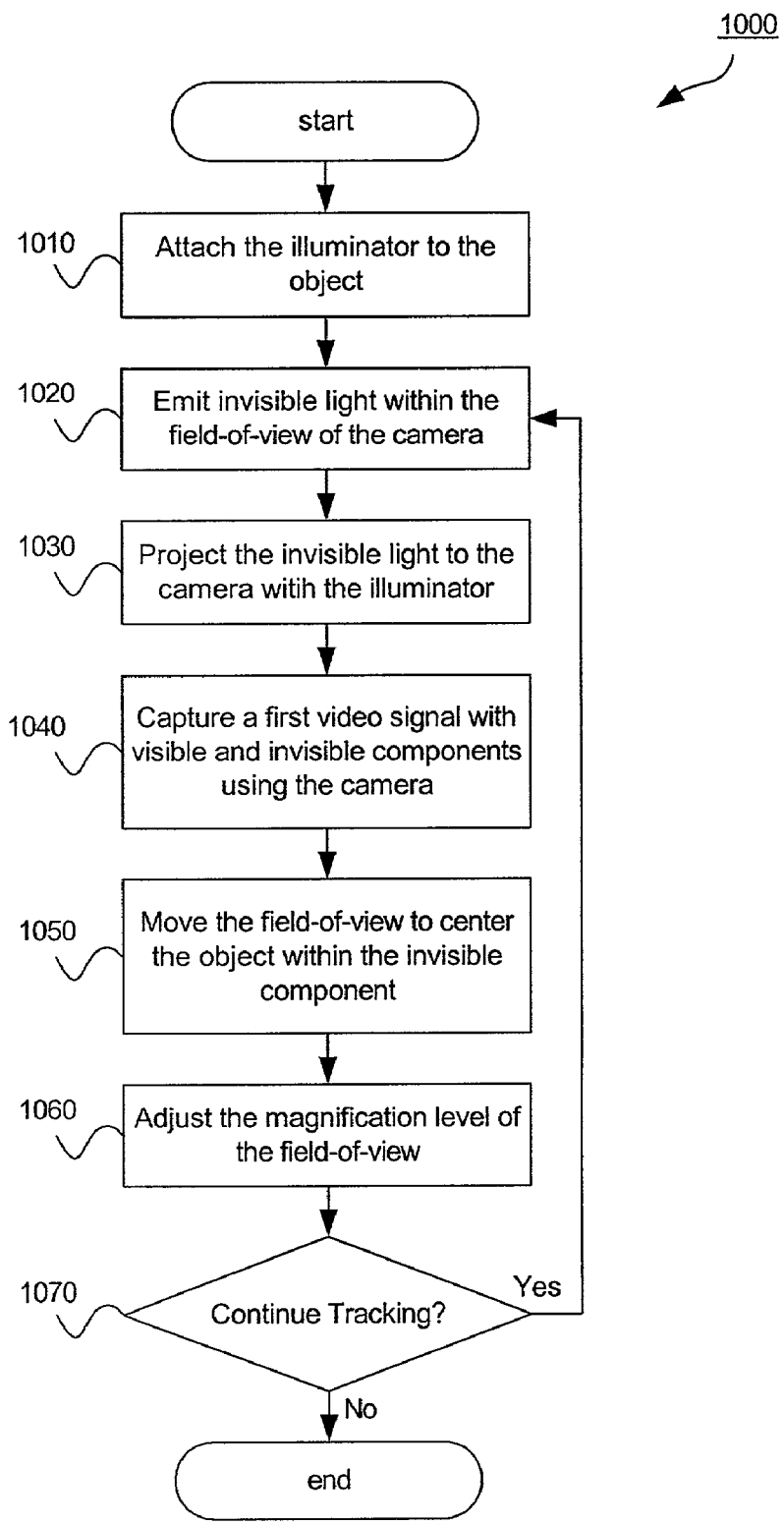
FIG. 10 is a flowchart of a tracking method according to an embodiment of the invention.

Referring to FIG. 10, one possible embodiment of a tracking method 1000 that may be carried out in conjunction with the tracking system 100 is depicted. The method 1000 assumes that the object 212 is to be tracked. The illuminator 220 may first be attached 1010 to the object 212. Such attachment may be accomplished through any known attachment mechanism, including clamps, clips, pins, adhesives, or the like.

Invisible light 134 may then be emitted 1020 such that the invisible light 134 enters the field-of-view 160 and impinges against the illuminator 220. The illuminator 220 projects 1030 the portion 136 of the invisible light 134 to the camera 140. The camera 140 captures 1040 a first video signal that includes the visible component 940 derived from visible light received by the camera 140 and the invisible component 942 derived from the portion 136 of invisible light received by the camera 140.

The field-of-view 160 is then moved 1050 or oriented, for example, by the tracking subsystem 950 to center the object 212 within the invisible component 942. The size of the field-of-view 160 may be adjusted by the zoom subsystem 952 to obtain the desired zoom factor.

Since the head 212 of the person 210 can be expected to move about within the field-of-view 160, tracking and zooming may be carried out continuously until centering and zooming are no longer desired. If tracking is to continue 1070, the steps from emitting 1020 invisible light through adjusting 1060 the magnification level may be repeated continuously. If there is no further need for tracking and zooming, i.e., if videoconferencing has been terminated or the user has otherwise selected to discontinue zooming and tracking, the tracking method 1000 may terminate.

For each of the steps of moving 1050 the field-of-view 160 and adjusting 1060 the magnification level of the field-of-view 160, the tracking system 100 may perform multiple tasks. Such tasks will be outlined in greater detail in connection with FIGS. 11 and 12, which provide two embodiments for moving 1050 the field-of-view 160, and FIGS. 13 and 14, which provide two embodiments for adjusting 1060 the magnification level of the field-of-view 160.

Figure 11:
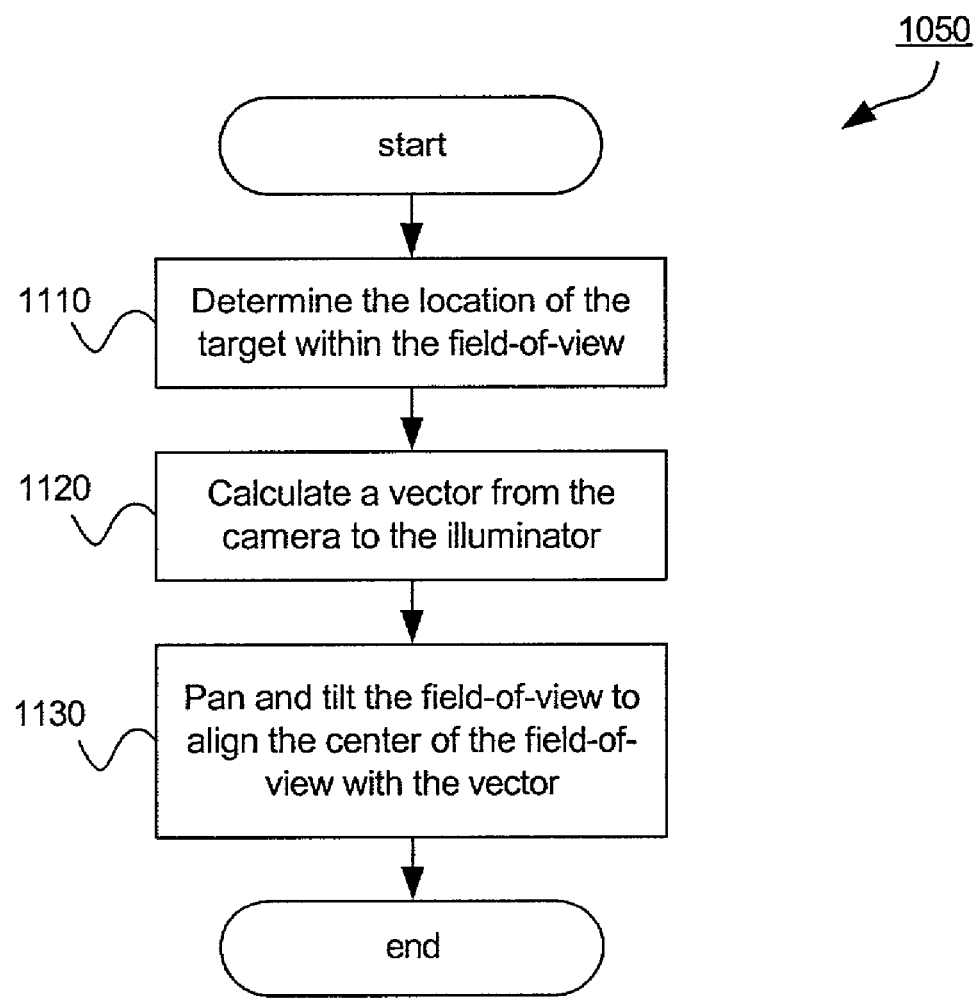
FIG. 11 is a flowchart depicting one embodiment of a centering method suitable for the tracking method of FIG. 10.

Referring to FIG. 11, moving 1050 the field-of-view 160 may include determining 1110 the location of the target reflected by the illuminator 220 within the field-of-view 160. The object vector 150 may then be calculated 1120, for example, by the vector calculator 960. The field-of-view 160 may then be panned and tilted 1130 to align the center vector 152 of the field-of-view 160 with the object vector 150.

Figure 12:
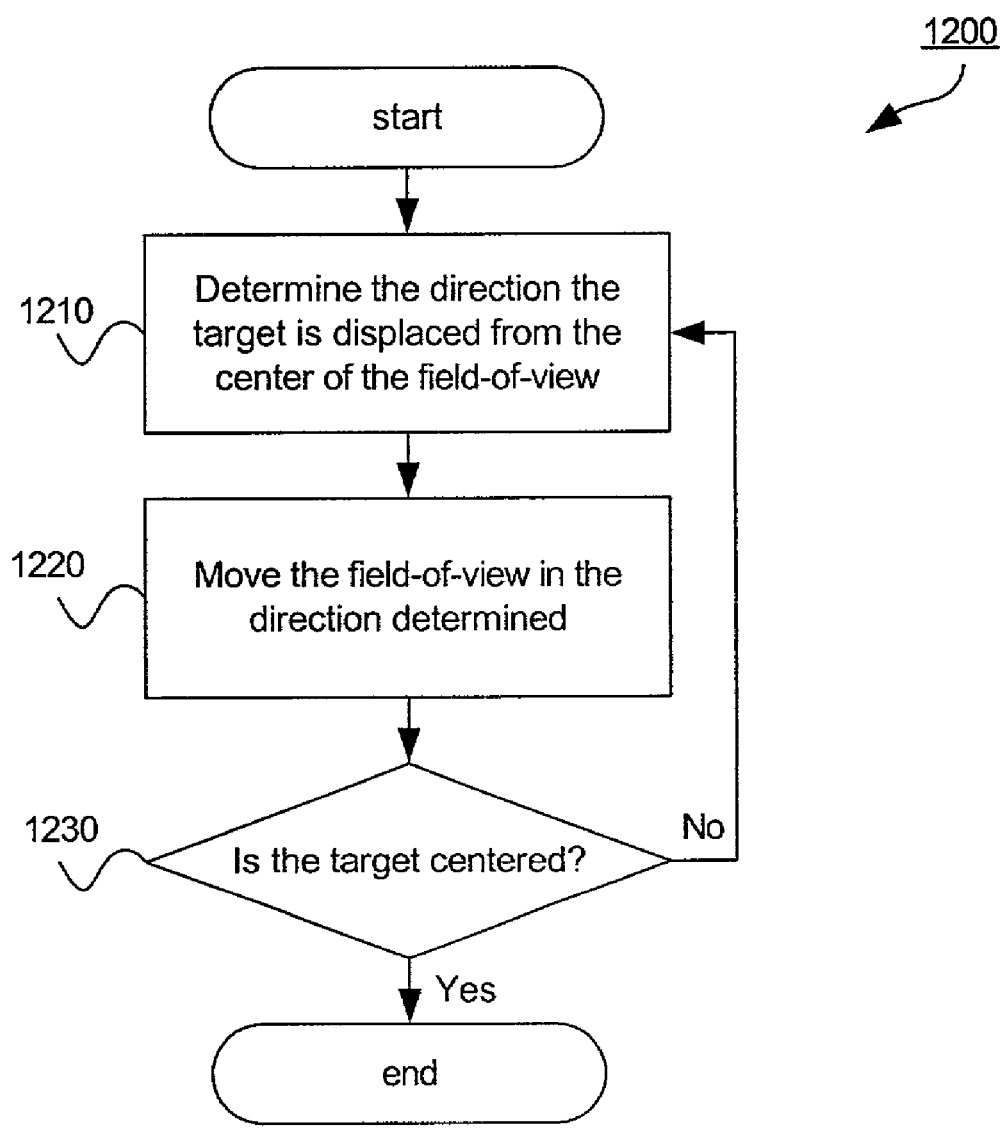
FIG. 12 is a flowchart depicting another embodiment of a centering method suitable for the tracking method of FIG. 10.

Referring to FIG. 12, an alternative embodiment of a centering method 1200 is depicted, which may operate in place of the method 1050 described in FIG. 11. The method 1050 of FIG. 11 may be referred to as analytical, while the method 1200 utilizes trial and error.

The centering method 1200 may commence with determining 1210 the direction the target, or the object 212, is displaced from the center 240 of the field-of-view 160. The field-of-view 160 may then be moved 1220, or panned and tilted, so that the center 240 is brought closer to the target provided by the illuminator 220, or the object 212. If the target is not yet centered, the steps of determining 1210 the direction to the target and moving 1220 the field-of-view 160 may be repeated until the target is centered, or within a threshold distance of the center 240 of the field-of-view 160.

Figure 13:
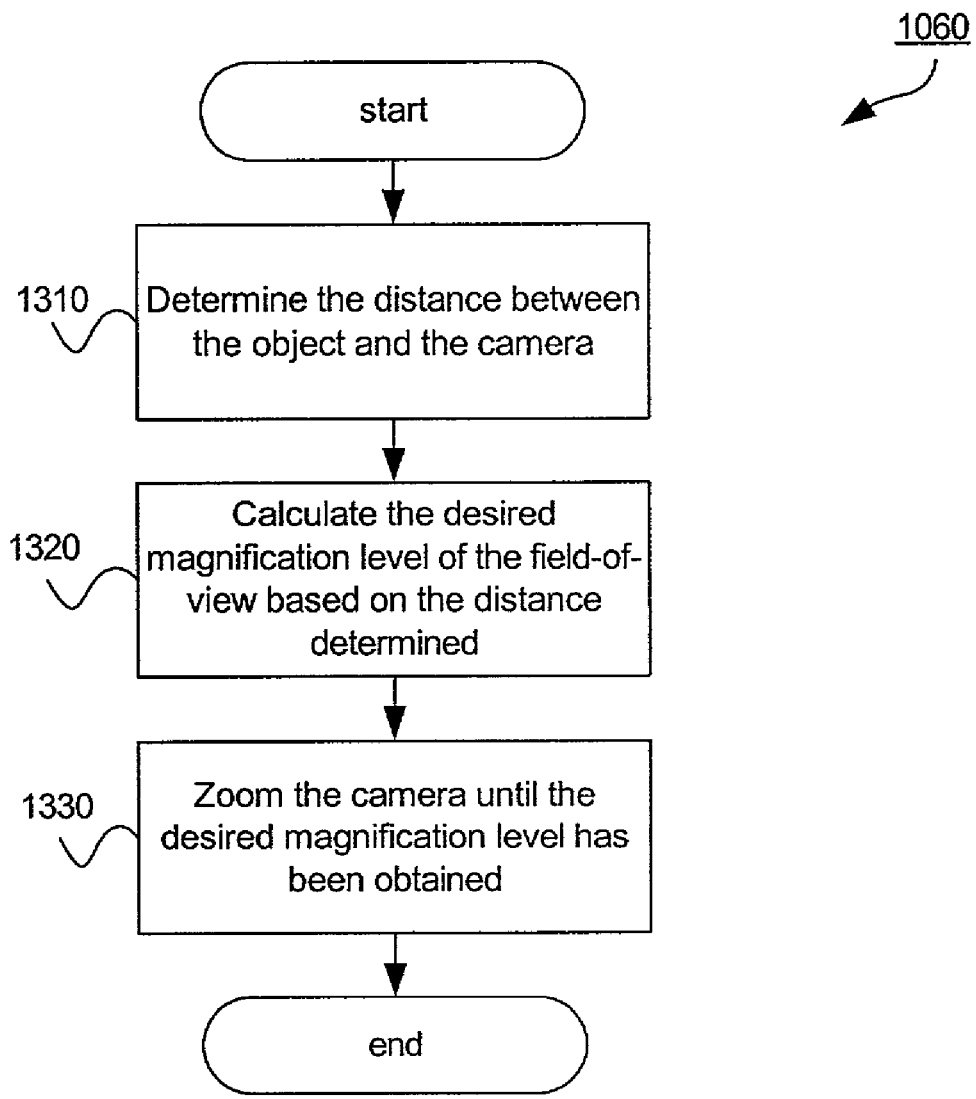
FIG. 13 is a flowchart depicting one embodiment of a zooming method suitable for the tracking method of FIG. 10.

Referring to FIG. 13, adjusting 1060 the magnification level of the field-of-view 160 may commence with determining 1310 the distance 972 between the object 212 and the camera 140. Determining 1310 the distance may be carried out by the range finder 970, or by a range finding assembly 743 if a camera such as the camera 740 is used. The desired magnification level of the field-of-view 160 may then be calculated 1320 using the distance 972, for example, by maintaining a constant ratio of the distance 972 to the size of the field-of-view 160. The camera may then be zoomed 1330 until the desired magnification level has been achieved.

Figure 14:
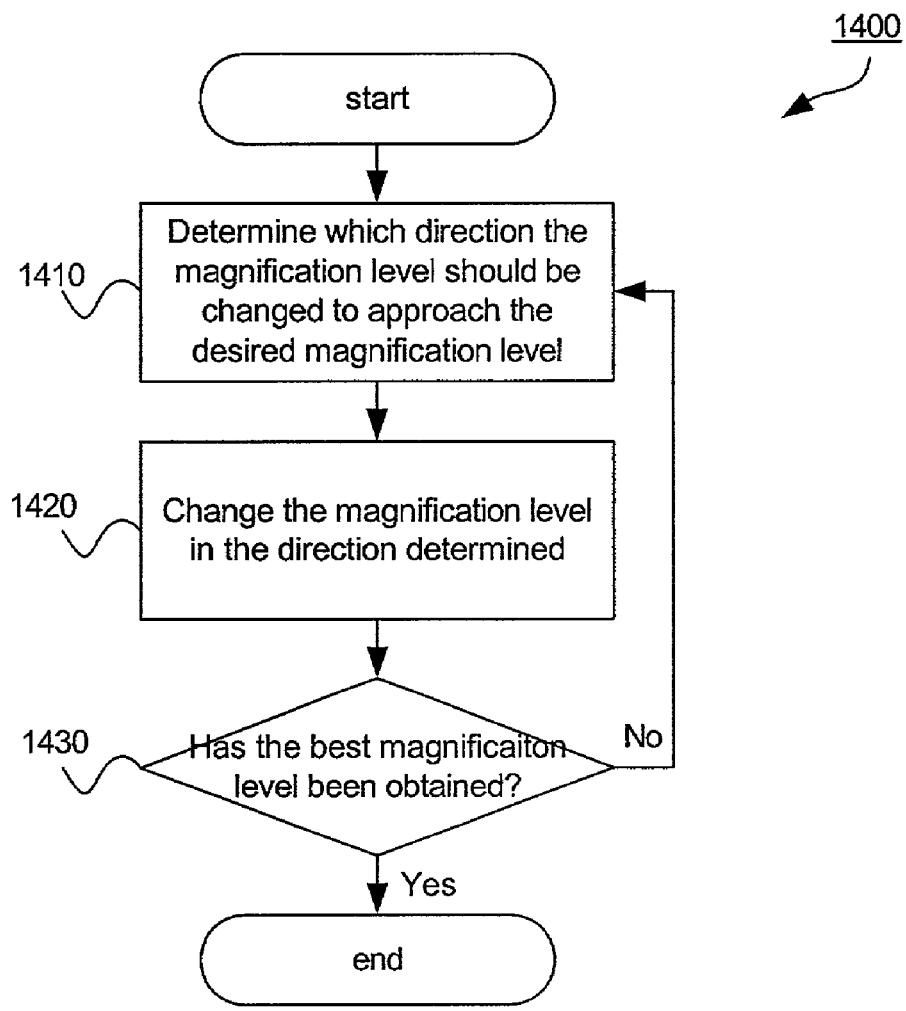
FIG. 14 is a flowchart depicting another embodiment of a zooming method suitable for the tracking method of FIG. 10.

Referring to FIG. 14, an alternative embodiment of a zooming method 1400 is depicted, which may operate in place of the method 1060 described in FIG. 13. Like the method 1050 of FIG. 11, the method 1060 of FIG. 13 may be referred to as analytical, while the method 1400 utilizes trial and error, like the method 1200.

The method 1400 may first determine 1410 whether the magnification level is too large or too small, i.e., whether the object 212 appears too large or too small in the field-of-view 160. The magnification level may then be changed 1420 incrementally in the direction required to approach the desired magnification level. If the best (i.e., desired) magnification level has not been obtained 1430, the method 1400 may iteratively determine 1410 in which direction such a change is necessary and change 1420 the magnification level in the necessary direction, until the desired magnification level is obtained.

The methods presented in FIGS. 10 through 14 may be utilized with a number of different embodiments besides those explicitly described in the foregoing examples. Furthermore, those of skill in the art will recognize that other methods may be used to carry out tracking and zooming according to the invention.

Those of skill in the art will recognize that tracking may also be accomplished in a number of ways within the scope of the invention. For example, low power microwave radiation may be emitted by an emitter similar to the emitter 130 of FIG. 1. Invisible light within the microwave frequency band may be somewhat more readily distinguished from ambient light, such as electromagnetic emissions from the sun, artificial lights, or other warm objects. The light produced by such ambient sources may be mostly infrared or visible. Hence, the use of microwave radiation may enable more effective tracking by reducing ambient interference. Microwave radiation may be read and processed in substantially the same manner as described above.

Furthermore, regardless of the frequency of light detected, additional processing may be carried out to distinguish between objects to be tracked and surrounding objects. For example, through a method such as Doppler detection, differentials between emitted wavelengths and received wavelengths may be used to determine whether an object is moving toward or away from the camera. Objects in motion, such as people, may therefore project light with a frequency shifted somewhat from the frequency of the emitted light. Conversely, stationary objects may be assumed to project a consistent frequency. Thus, a moving object may be distinguished from other changes in electromagnetic emission, such as changing sunlight patterns.

Figure 15:
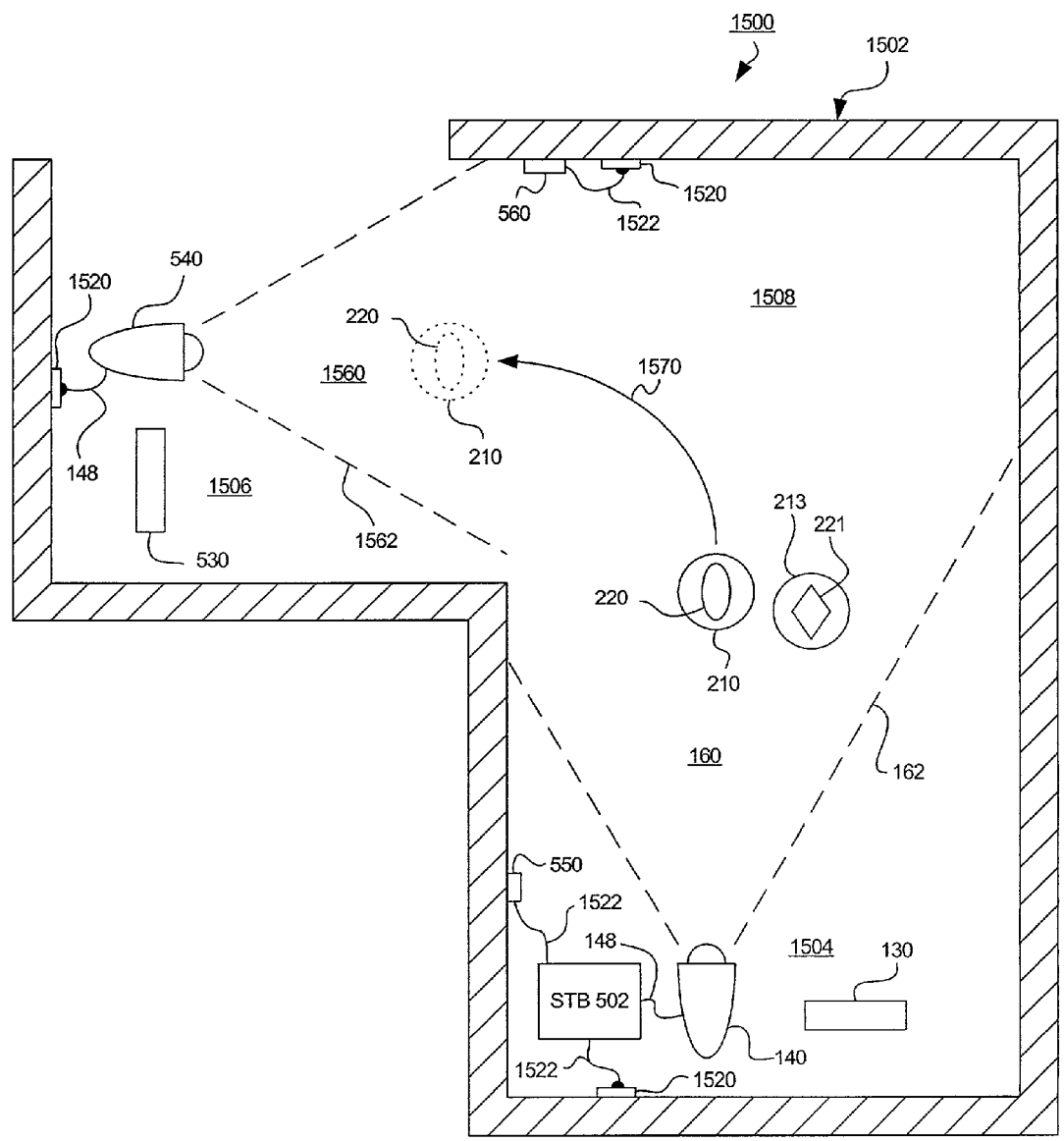
FIG. 15 is a plan view of an exemplary video communication system that incorporates a plurality of cameras.

Referring to FIG. 15, a plan view is shown of a video communication system 1500 according to an embodiment of the invention. A plurality of walls 1502 are shown to denote an interior space, such as rooms of a home or place of business. The walls 1502 are shaped to form a first alcove 1504 and a second alcove 1506 that do not have direct line-of-sight to each other. Hence, the first camera 140, first emitter 130, and STB 502 may be positioned within the first alcove 1504, while the second camera 540 and second emitter 530 are positioned in the second alcove 1506. An overlap region 1508 is visible from both of the alcoves 1504, 1506.

The cameras 140, 540 may be networked together, with the STB 502 as the hub of the network. More specifically, the output cord 148 of the camera 140 may be connected directly to the STB 502, while the output cord 148 of the camera 540 is connected to the STB 502 via data lines (not shown) positioned within the walls 1502. Such data lines may take the form of RJ-45 (Category 5) cables, coaxial data cables, or other cables commonly present in homes and offices for computer networking purposes. Of course, wireless networking may also be used within the scope of the invention.

The output cord 148 of the second camera 540 may thus simply be plugged into a networking jack 1520. The STB 502 may have a data line 1522 plugged into a similar networking jack 1520, through which the STB 502 receives data from the second camera 540 and any other cameras connected to the data lines within the walls 1502.

The field-of-view 160 of the first camera 140 extends along the first alcove 1504; once again, boundaries of the field-of-view 160 are depicted by the dashed lines 162. A field-of-view 1560 of the second camera 540 extends along the second alcove 1506, as depicted by the dashed lines 1562. As shown, the people 210, 213 (shown as circles) are initially located within the field-of-view 160 of the first camera 140. As with previous figures, the illuminator 220 is disposed on the person 210, and the illuminator 221 is disposed on the person 213. Again, the illuminator 220 is elliptical in shape, while the illuminator 221 is diamond-shaped. As described in greater detail below, characteristics other than shapes may be used to differentiate between the illuminators 220, 221.

If the person 210 is engaged in videoconferencing, it may be desirable to have the camera 140 track and zoom in on the person 210. The videoconferencing system 1500 thus needs to be able to determine which of the illuminators 220, 221 to follow, and which to ignore. As a result, it is desirable to enable the system 1500 to distinguish between the illuminators 220, 221 and keep track of which person 210, 213 is to be followed.

Such an identification function may also be used to enable automatic control of other implements unrelated to videoconferencing. For example, as mentioned previously, the STB 502 may be connected to other devices such as a thermostat 550 and a security control panel 560.

As shown, the thermostat 550 is located in the first alcove 1504, and is directly connected to the STB 502 by a data line 1522. The security control panel 560 is positioned in the overlap region 1508, and is connected to a networking jack 1520 by a data line 1522. The security control panel 560 is thus connected to the STB 502 via the data lines within the walls 1502, in a manner similar to the second camera 540.

Such devices may be automatically controlled by the STB 502 based on the location of the people 210, 213. For example, when a person 210 or 213 enters the first alcove 1504, the system 1500 may detect their presence and adjust the temperature setting of the thermostat 550 according to their preference. Similarly, when a person 210 or 213 enters the second alcove 1506 or the overlap region 1508, the system 1500 may detect their presence and transmit signals to the security control panel 560 to deactivate alarm systems.

Furthermore, the system 1500 may beneficially utilize the illuminators 220, 221 to automatically control the cameras 140, 540. For example, the person 210 may move from the first alcove 1504 to the second alcove 1506, in the direction shown by the arrow 1570 to reach the position shown by the person 210 and illuminator 220 in phantom. In such a case, it may be desirable to switch video reception from the first camera 140 to the second camera 540. Such switching may beneficially occur without the explicit control of the person 210; hence, videoconferencing may continue naturally and without interruption while the person 210 moves.

Consequently, it would be desirable for the videoconferencing system 1500 to automatically identify objects, including people, within the fields-of-view 160, 1560. Such identification may be used to provide automatic tracking, zooming, and control of other functions based on the location of key objects. Furthermore, it would be desirable for the system 1500 to automatically "handoff" video transmission between the cameras 140, 540 based on the location of the object that is the subject of videoconferencing, i.e., the person 210 in the example of FIG. 15.

Identification and handoff may be carried out independently, or in conjunction with the intelligent tracking and/or zooming methods described previously. Exemplary systems and methods for accomplishing identification and handoff will be described in connection with FIGS. 16, 17, and 18, as follows.

Referring to FIG. 16, one embodiment of a database 1600 is shown. The database 1600 may be stored within the STB 502, for example, within the memory 820. The database 1600 may have a plurality of identity characteristics 1602 that correspond to properties of the targets projected by the illuminators 220, 221. The identity characteristics are simply properties that can be recognized through the use of known computerized matching techniques such as pattern recognition and optical character recognition (OCR) algorithms.

Such algorithms typically segment an image, for example, into a grid, and analyze the patterns formed by adjacent segments. Some algorithms utilize artificial neural network (ANN) technology. Some utilize "connected component analysis," or a method of grouping portions of an image into components and then analyzing their relationship with each other. In any case, most such algorithms maintain a stored list of known, or "learned", templates, with which shapes of the image are to be compared. The identity characteristics 1602 may thus be known templates for pattern recognition.

As shown, the identity characteristics 1602 may be shapes of the illuminators 220, 221, such as the ellipse and diamond depicted in FIGS. 4A, 4B, and 15. The shapes may be selected for easy differentiation by computer; thus, simple rounded or polygonal shapes may advantageously be used. The shapes may also be selected such that no two are alike when rotated or angled. Consequently, it may be helpful to avoid attempting to distinguish between a circle and an ellipse, or a square and a diamond. Polygonal shapes may be beneficial in that a computer may relatively easily count the points or flat segments of the shape; such an analysis does not depend greatly on the angle or rotational orientation of the shape.

Of course, the identity characteristics 1602 need not be shapes, but may be based on a variety of properties of the targets projected by the illuminators 220, 221. For example, the identity characteristics 1602 may be wavelengths of invisible light received from the illuminators 220, 221. The illuminators 220, 221 may simply be tuned to project different frequencies.

Alternatively, the identity characteristics 1602 may be intensities of the invisible light received from the illuminators 220, 221. The illuminators 220, 221 may thus be configured to project light with different intensities. For example, if the illuminators 220, 221 are reflectors, they may have comparatively different reflectivities. If the illuminators 220, 221 are portable emitters, they may operate at different power levels.

The identity characteristics 1602 may also be sizes of the targets projected by the illuminators 220, 221. Without knowing the range to each illuminator 220, 221, it may be impossible to determine whether a size difference is the result of different illuminator sizes or different ranges. Hence, size determination may only be usable in situations in which the illuminators 220, 221 are kept generally equidistant from the cameras 140, 540, or in which the range to each illuminator 220, 221 is known. For example, if a range finder 970 such as the range finding assembly 743 of FIG. 7 is present within the zoom subsystem 952, the ranges to the illuminators 220, 221 may be known, and therefore accounted for to enable identification based on size.

Alternatively, the identity characteristics 1602 may be patterns or frequencies of variation of the invisible light received from the illuminators 220, 221. For example, if the illuminators 220, 221 are portable emitters, they may each provide a time-varied, or "pulsing," pattern of infrared light that can be received and interpreted by the cameras 140, 540. The variation in patterns may simply be a variation in pulsing frequency. Alternatively, other differences such as varying pulse durations or amplitudes may be introduced.

The identity characteristics 1602 may also be derived from the presence of multiple illuminators. For example, each identity characteristic 1602 may be a pattern of targets received from a set of illuminators 220 or 221. The pattern may include shapes positioned with a specified separation and relative orientation. Alternatively, the pattern may simply specify a composition of shapes, for example, 30% squares, 50% circles, and 20% triangles.

The use of multiple shapes may be advantageous in that the shapes can be miniaturized and embedded in a fluid or powder. Thus, for example, shapes of the specified composition may be included in an inconspicuous makeup or lotion. A user may then simply apply the customized makeup or lotion to the part of the body to be identified and/or tracked, such as the head. For such an embodiment, the cameras 140, 540 may have an enhanced resolution and/or optical zooming capability to provide recognition of miniature shapes.

Of course, the identity characteristics 1602 may include any other properties of the targets projected by the illuminators 220, 221. Additionally, the identity characteristics 1602 may be combinations of the above-described properties. For example, each illuminator 220, 221 may have a different shape and a different pulsing pattern to enhance the reliability of the differentiation process.

The database 1600 may also include a plurality of identities 1604, which are simply labels for the objects to be identified. Each of the identities 1604 may correspond to one of the identity characteristics 1602. In FIG. 16, it is assumed that the objects to be identified are people. Thus, the identities 1604 are names of people. Of course, the identities 1604 need not be names, but may be any set of unique designations such as numbers or the like. However, names may be helpful for purposes of user interfacing with the database 1600.

"Bob" may be the father in a household, with "Bertha" as the mother. "Helga" may be a young daughter, while "Duane" is a guest. Each of the identities 1604 may have one or more settings 1606 that define actions to be taken by the system 1500 in response to detection of the identity 1604.

For example, the settings 1606 may include an access level 1622 that defines the degree to which each of the identities 1604 is able to access the system 1500. Bob and Bertha, as the parents, have "full" access, and are thus able to make conference calls, operate the thermostat 550 and security control panel 560, and perform any other functions controlled through the system 1500. As a guest, Duane has no independent access. Helga has limited access, for television viewing and local calls only. The access level 1622 may thus prevent Duane and Helga from making long distance calls unless Bob or Bertha is present.

The settings 1606 may also include a status level 1624 that defines the degree of priority each identity 1604 possesses with respect to system operation. More specifically, the status level 1624 may specify what action should be taken in the event that two identities 1604 with conflicting settings are simultaneously present. Dominant status levels 1624 may generally receive priority. In the event that a videoconferencing call is in progress, however, the call may take precedence. The operation of the status level 1624 will be described in greater detail subsequently.

Additionally, the settings 1606 may include an entertainment preference 1626 that defines entertainment functions that are to be automatically initiated upon detection of the associated identity 1604. For example, Bob may prefer that the television automatically be turned on to a news channel when he is present. Helga may prefer cartoons, while Duane likes classical music and Bertha favors heavy metal. If Bertha and Duane are simultaneously present, the system 1500 may revert to Bertha's preference because her status level 1624 is "dominant."

The settings 1606 may also include an environment preference such as a thermostat preference 1628. The thermostat preference 1628 defines the preferred setting of the thermostat 550 for each identity 1604. Other environment preferences, such as fan operation, humidifier operation, and even door or window operation, may also be included within the settings 1606, if desired.

Furthermore, the settings 1606 may include preferences related to operation of the cameras 140, 540 for videoconferencing. For example, a tracking preference 1630 may specify under what conditions the identity 1604 is to be tracked during video communication. Some people may wish, for example, to be continuously visible while they communicate, while others would prefer to escape the camera's field-of-view. Similarly, a zooming preference 1632 may determine the degree of zooming that is carried out during video communication.

The settings 1606 described previously are only examples; many other parameters of the user's environment may be altered automatically by the system 1500. Identity detection may be performed substantially with the same hardware used to perform tracking; however, additional software or firmware modules may be added to perform identity storage, identification, and system control. These modules will be shown and described in greater detail in FIG. 17.

Figure 17:
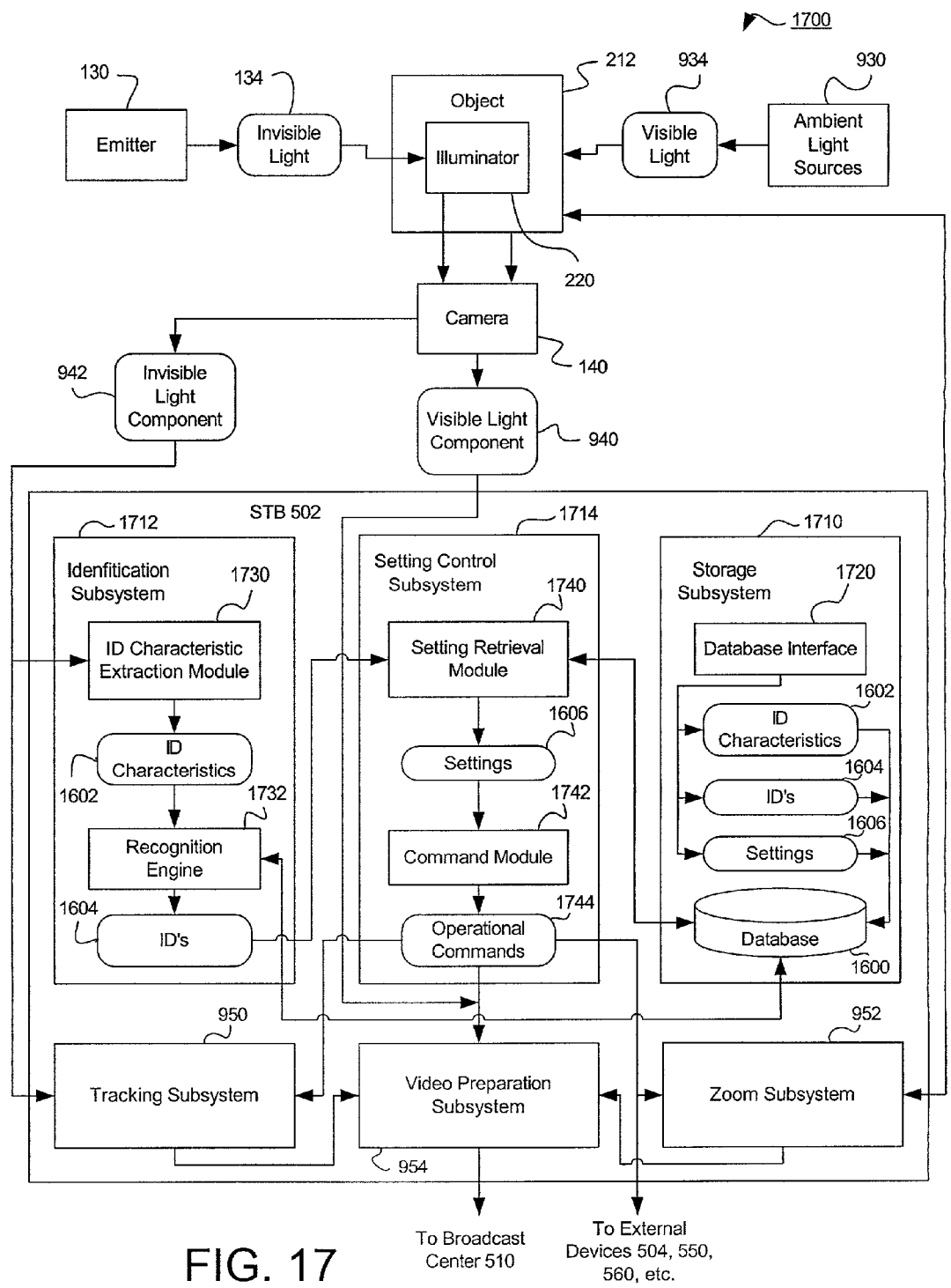
FIG. 17 is a logical block diagram depicting one possible mode of operation of the video communication system of FIG. 15.

Referring to FIG. 17, a logical block diagram 1700 shows one possible manner in which light and signals may interact in the videoconferencing system 1500 of FIG. 15. FIG. 17 depicts substantially the same view as FIG. 9; however, the tracking subsystem 950, the zoom subsystem 952, and the video preparation subsystem 954 have been collapsed for clarity. A storage subsystem 1710, an identification subsystem 1712, and a setting control subsystem 1714 have been added.

As with FIG. 9, the illustrated steps/components of FIG. 17 may be implemented in hardware, software, or firmware using any of the components of FIG. 8, alone or in combination. While various components are illustrated as being disposed within a STB 502, those skilled in the art will recognize that similar components may be included within the camera 140, itself.

The operation of the emitter 130, object 212, illuminator 220, ambient light sources 930, and camera 140 may be substantially as described in connection with FIG. 9. Hence, the STB 502 once again receives the visible light component 940 and the invisible light component 942. In the context of a videoconferencing system 1500 with multiple cameras, the STB 502 may receive visible and invisible light components 940, 942 from multiple cameras 140, 540 and process them either simultaneously or in rapid sequence.

Similarly, the tracking subsystem 950, the zoom subsystem 952, and the video preparation subsystem 954 may operate substantially as described previously. The invisible component 942 is routed to the tracking subsystem 950 to enable tracking. The zoom subsystem 952 may interact with the object 212 to permit determination of the range of the object 212 from the camera 140.

The storage subsystem 1710 may obtain and store the data that forms the database 1600. Hence, the storage subsystem 1710 may have a database interface 1720 that obtains the identity characteristics 1602, the identities 1604, and the settings 1606. The database interface 1720 may utilize a menu system displayed on the TV 504, into which the user can enter the data or select from a plurality of options. Alternatively, the database interface 1720 may be designed to receive the data in the form of vocal commands.

If desired, the database interface 1720 may track user activity and intelligently determine or suggest the settings 1606 based on patterns of activity. For instance, the system may notice when an identified individual changes temperature settings within a room, and may store corresponding settings within the database 1600. In any case, the identity characteristics 1602, identities 1604, and identity settings 1606 may then be stored within the database 1600 for subsequent retrieval.

The identification subsystem 1712 may process the invisible light component 942 to determine the identities 1604 associated with all identity characteristics 1602 present in the invisible light component 942, i.e., all objects with illuminators 220, 221 attached within the field-of-view 160 of the camera 140. The identification subsystem 1712 may also determine which illuminators 220, 221 are present within the fields-of-view of other cameras connected to the STB 502, such as the second camera 540.

The identification subsystem 1712 may have an identity characteristic extraction module 1730 that receives the invisible light component 942 and analyzes it to determine which identity characteristics 1602 are present. Thus, the identity characteristic extraction module 1730 may incorporate the pattern recognition algorithms or other algorithms described previously. The identity characteristic extraction module 1730 may thus scan the invisible light component 942 and submit all discovered identity characteristics 1602 to a recognition engine 1732.

The recognition engine 1732 may receive the identity characteristics 1602 and reference the database 1600 to determine which identities 1604 correspond to each of the identity characteristics 1602. The identities 1604 may then be conveyed to the setting control subsystem 1714. The setting control subsystem 1714 may utilize the identities 1604 to determine how to control other subsystems and devices.

More specifically, the setting control subsystem 1714 may have a setting retrieval module 1740 that receives the identities 1604 from the recognition engine 1732. The setting retrieval module 1740 references the database 1600 to obtain all relevant settings 1606 for each of the identities 1604. The settings 1606 may be conveyed to a command module 1742. The command module 1742 may utilize the settings 1606 to determine which operational commands 1744 are to be conveyed to which subsystems or devices.

For example, operational commands 1744 may be delivered to the tracking subsystem 950 and the zoom subsystem 952 based on the tracking and zooming preferences 1630, 1632. Operational commands 1744 may also be transmitted to external devices such as the TV 504, thermostat 550, security control panel 560, and any other devices controlled by the STB 502.

If desired, feedback systems (not shown) may also be present between the external devices 504, 550, 560, etc. and the STB 502 so that the command module 1742 can learn from behavior patterns of users and/or take the current status of the external devices 504, 550, 560 into account. For example, a person (i.e., an identity 1604) may have no established entertainment preference 1626, but may consistently turn on the TV 504 to watch basketball games. The command module 1742 may sense the pattern of activity and change the entertainment preference 1626 that corresponds to the identity 1604 accordingly, so that the TV 504 is automatically turned on and switched to a basketball game (if available) when the person enters the area.

Similarly, a person may have a thermostat preference 1628 of 65°. If the person has just manually changed the thermostat 550 to 70°, left the area, and returned, the command module 1742 may temporarily override the thermostat preference 1628 and leave the thermostat 550 at 70°.

The video preparation subsystem 954 may determine which camera 140, 540 is to be active. More specifically, if the STB 502 is connected to multiple cameras 140, 540, as shown in FIG. 15, the STB 502 may activate the camera 140 or 540 with the best view of the communicating person. In the course of operation, the tracking subsystem 950 obtains an approximate location of the object to be tracked, as described previously.

Such positional information may be utilized by the video preparation subsystem 954 to determine which camera 140, 540 is in the best position for viewing the communicating person. The video preparation subsystem 954 may process and transmit the visible light component 940 of the camera 140 or 540 that is in the best position.

Of course, the various subsystems 950, 952, 954, 1710, 1712, 1714 of the STB 502 may operate cyclically. Thus, the system 1500 may be continuously checking to see if any new identities 1604 have arrived within the fields-of-view 160, 1560, and issuing operational commands 1744 when new identities 1604 are detected. Similarly, the video preparation subsystem 954 may continuously monitor the location of the communicating identity 1604, and may change active cameras 140, 540 as soon as the communicating identity 1604 moves from one field-of-view 160, 1560 to the other. One possible mode of operation of the system 1500 will be shown and described in greater detail in conjunction with FIG. 18.

Figure 18:
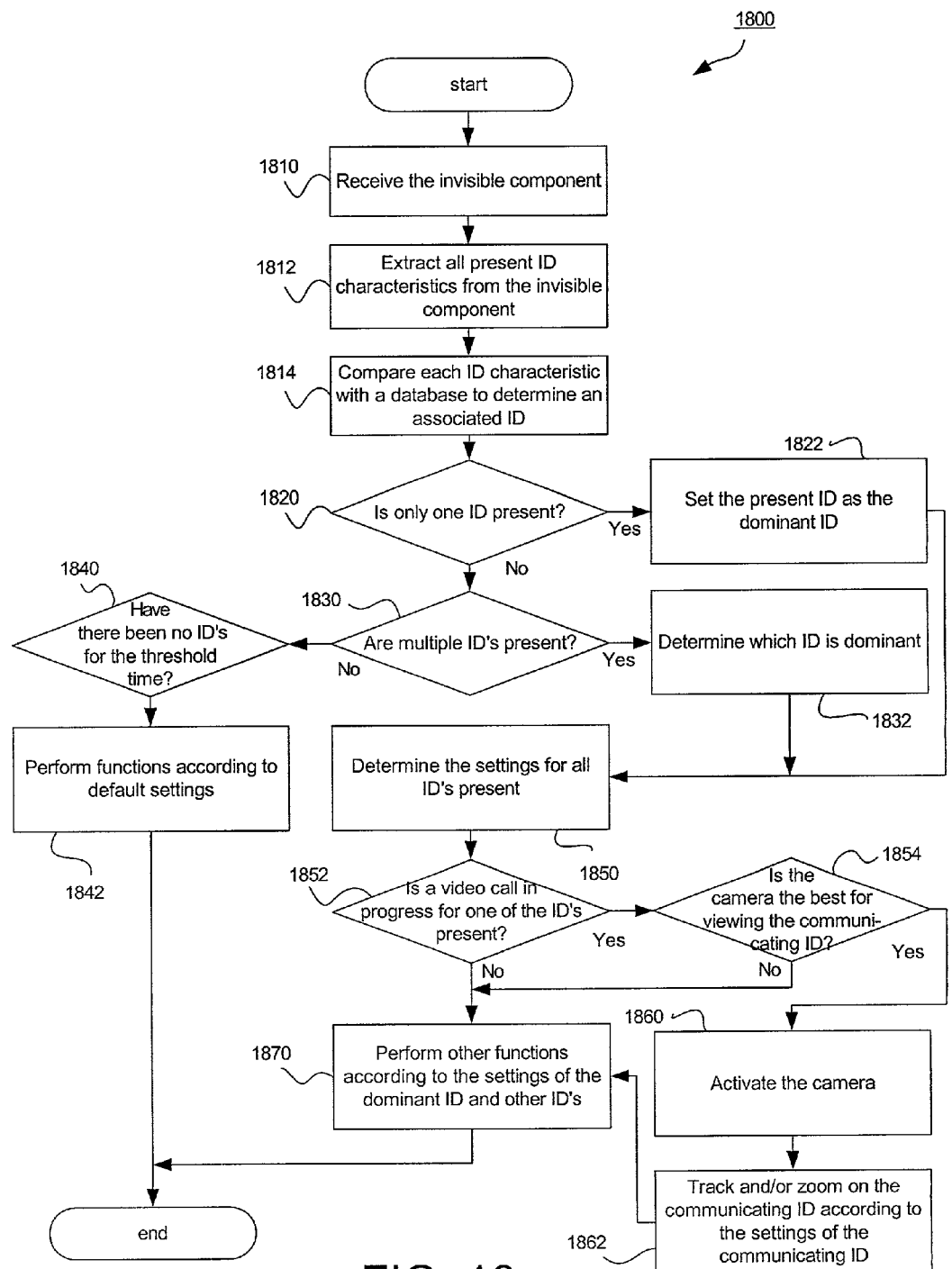
FIG. 18 is a flowchart depicting one embodiment of an identification method usable in conjunction with the video communication system of FIG. 15.

Referring to FIG. 18, one embodiment of an identification and control method 1800 is depicted. The method 1800 may be carried out periodically, such as once every second, or even once for every frame received by the cameras 140, 540. Furthermore, the method 1800 may be carried out independently for each of the cameras 140, 540, since each camera 140, 540 is positioned in a different area, in which different commands are to be carried out.

Initially, the STB 502 may receive 1810 the invisible light component 942 from the camera 140 or 540. All discernable identity characteristics 1602 may then be extracted 1812 from the invisible light component 942 and compared 1814 with the database 1600 to obtain the identities 1604 associated with each of the identity characteristics 1602.

Once the identities 1604 have been obtained, the system 1500 may determine 1820 whether only one identity 1604 is present. If only one identity 1604 is present, the present identity 1604 is set 1822 to be the dominant identity 1604, regardless of the status level 1624 of the identity 1604.

If there is not only one identity 1604 present, the system 1500 may determine 1830 whether multiple identities 1604 are present. If so, the system 1500 may proceed to determine 1832 which of the detected identities 1604 is dominant. Such a determination may be made, for example, by comparing the status levels 1624 of all identities 1604 present. If multiple identities 1604 have the same status level 1624, for example, two identities 1604 are "dominant," the system 1500 may select one based upon usage history, proximity, random selection, or any other method.

If a single identity 1604 is not present and multiple identities 1604 are not present, then no identities 1604 are present. The system 1500 may then determine 1840 whether no identities 1604 have been present for a threshold time period. If no identities 1604 have been present for the threshold time, the system 1500 may perform 1842 functions according to default settings. For example, the default settings may be to turn off all entertainment devices and lights, activate the security control panel 560, set the thermostat 550 to an energy efficient level, etc.

Assuming one or more identities 1604 are present, the system 1500 may determine 1850 the settings 1606 for all identities 1604 present. Of course, selected settings 1606, such as the access level 1622 and status level 1624, may have already been determined in conjunction with previous steps. The system 1500 may then determine 1852 whether a video call is in progress for one of the identities 1604 present. The calling status of an identity 1604 may be listed in the status level 1624 field of the database 1600 because a video call may give the caller precedence over settings 1606 of other identities 1604.

If a video call is in progress, the system 1500 may determine 1854 whether the camera 140 or 540 that received 1810 the invisible component 942 is the best camera 140 or 540 for viewing the identity 1604 engaged in the video call. As mentioned previously, this determination may be made with the aid of the tracking subsystem 950; the zoom subsystem 952 may also provide useful positional data for the identity 1604 in communication. The determination of which camera 140, 540 is best to view the identity 1604 may depend upon the range from the identity 1604 to each camera 140, 540, the direction in which the identity 1604 is moving, the position of the identity 1604 within the fields-of-view 160, 1560 of the cameras 140, 540, and other factors.

If the camera 140 or 540 is the best for viewing the identity 1604 in video communication, the system 1500 may activate 1860 the camera 140 or 540. In this context, "activation" refers to usage of the camera 140 or 540 to receive and transmit the visible light component 940 to a remote terminal (not shown) for display. In order to conduct identification, the STB 502 may continuously receive and process the invisible light components 942 from all cameras 140, 540, and possibly even the visible light components 940. The visible light component 940 from a given camera 140 or 540 simply is not transmitted to another party until the camera 140 or 540 is activated.

Once the camera 140 or 540 has been activated, the system 1500 may track and/or zoom in on the communicating identity 1604 through any of the methods described previously. Accordingly, tracking and/or zooming 1862 may entail moving the camera 140 or 540, or cropping the visible component 940 to carry out software steerable tracking and zooming. As mentioned previously, tracking and zooming 1862 may be carried out according to the tracking and zooming preferences 1630, 1632 for the communicating identity 1604.

Regardless of whether the camera 140 or 540 is the best for viewing the communicating identity 1604, the system 1500 may perform 1870 other functions according to the settings 1606 for the dominant identity 1604, and possibly other identities 1604. Functions that utilize audible or visual media may be overridden by the video call; hence, the communicating identity 1604 may receive priority over entertainment preferences 1626 and the like. Once the call terminates, the system 1500 may then revert to the entertainment preference 1626 of the dominant identity 1604.

If desired, the status level 1624 may not operate universally. For example, the status level 1624 need not apply to all other settings 1606. Each of the settings 1606 may even have its own status level. Thus, when both Bertha and Helga are present, Bertha's thermostat preference 1628 may still receive priority, while Helga's entertainment preference 1626 takes precedence.

Furthermore, each of the settings 1606 may have its own customized version of the access level 1622. Hence, Helga may be permitted to change the thermostat 550 only within the range of 60° to 80°. Similarly, Helga may be permitted to watch only television programming with a rating of TV-PG or better. Duane may be permitted to use the thermostat 550, but not the security control panel 560.

As mentioned previously, the method 1800 described above is repeated frequently for each of the cameras 140, 540. Hence, when a new identity 1604 enters the area of one of the cameras 140, 540, the system 1500 may react rapidly if the settings 1606 require that any action be taken.

Similarly, during videoconferencing, the communicating identity 1604, or the person 210 in the example of FIG. 15, may move from the field-of-view 160 of the first camera 140 to the field-of-view 1560 of the second camera 540. In such a situation, when the method 1800 is carried out for the first camera 140, it is determined that the first camera 1854 is no longer the best for viewing the person 210.

When the method 1800 is carried out for the second camera 540, the system 1500 determines that the second camera 540 is the best for viewing the person 210. Hence, tracking and/or zooming 1862 are carried out with respect to the second camera 540, and the visible component 940 from the second camera 540 is transmitted to the remote terminal by the STB 502. The method 1800 may operate rapidly and frequently enough that the handoff from one camera to the other is substantially seamless for the person with whom the person 210 is communicating.

Based on the foregoing, the present invention offers a number of advantages not available in conventional approaches. Objects, including people, can be automatically identified when they enter a field-of-view of a camera. The identification can be used to ensure that the correct object is tracked during videoconferencing with the proper tracking and zooming parameters. The object may be tracked seamlessly during movement from one camera to another. Furthermore, other devices may be automatically controlled based on the presence or absence of certain objects. Thus, a person need not continuously adjust hardware related to videoconferencing or other functions; rather, such adjustments may simply be made automatically according to established user preferences.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A system for automatically identifying an object with a camera, the system comprising:
   an invisible light illuminator, disposed on the object to be identified, that projects a target of invisible light;
   a camera, sensitive to invisible light, that captures a first video signal depicting the object, the first video signal having visible and invisible components; and an identification subsystem that processes the invisible component to determine the identity of the object without reference to the object's position or speed.

2. The system of claim 1, wherein the illuminator comprises a reflector, the system further comprising:
a stationary invisible light emitter that generates invisible light reflected by the reflector to project the target.

3. The system of claim 1, wherein the illuminator comprises a portable invisible light emitter that generates invisible light to project the target.

4. The system of claim 1, wherein the invisible light comprises infrared light.

5. The system of claim 1, wherein the invisible light comprises ultraviolet light.

6. The system of claim 1, wherein the illuminator comprises an illuminating side and a non-illuminating side, the non-illuminating side comprising an adhesive for affixing the illuminator to the object to be identified.

7. The system of claim 1, wherein the object to be identified comprises a person engaged in video communication using the camera.

8. The system of claim 7, wherein the illuminator comprises a coating applied directly to skin of the person, wherein the coating projects invisible light.

9. The system of claim 7, wherein the illuminator is attached to an article worn by the person.

10. The system of claim 9, wherein the article is selected from the group consisting of a pair of glasses, a tie clip, and a piece of jewelry.

11. The system of claim 1, wherein the object to be identified is selected from the group consisting of a remote control device and a set of keys.

12. The system of claim 1, wherein the camera comprises:
a wide frequency image collection array that generates the visible component and the invisible component of the first video signal.

13. The system of claim 1, wherein the camera comprises:
a first image collection array that generates the visible component of the first video signal; and
a second image collection array that generates the invisible component of the first video signal.

14. The system of claim 1, wherein the identification subsystem comprises:
an identity characteristic extraction module that extracts an identity characteristic of the object from the invisible component.

15. The system of claim 14, wherein the identification subsystem further comprises:
a recognition engine that compares the identity characteristic with a database to identify the object.

16. The system of claim 15, further comprising:
a database that stores a plurality of identity characteristics, each of which corresponds to an identity of an object.

17. The system of claim 16, wherein the storage subsystem comprises:
a database interface that receives the plurality of identity characteristics and corresponding identities from a user and stores the identity characteristic and corresponding identities in the database.

18. The system of claim 17, wherein the database contains at least one setting for each identity, the system commencing operation according to the setting in response to determination of the identity.

19. The system of claim 18, wherein the setting comprises an access level that defines circumstances under which the identity is able to control the system.

20. The system of claim 18, wherein the setting comprises a status level that defines circumstances under which a preference has priority over preferences of other identities.

21. The system of claim 18, wherein the setting comprises an entertainment preference that defines operation of entertainment hardware associated with the system.

22. The system of claim 18, wherein the setting comprises an environment preference that defines operation of environment control hardware associated with the system.

23. The system of claim 18, further comprising:
a tracking subsystem that orients a first field-of-view of the camera to center the target within the first field of view.

24. The system of claim 23, wherein the setting comprises a tracking preference that defines operation of the tracking subsystem.

25. The system of claim 18, wherein the camera has a first field-of-view with a magnification level, the system further comprising:
a zoom subsystem that automatically adjusts the magnification level.

26. The system of claim 25, wherein the setting comprises a zooming preference that defines operation of the zooming subsystem.

27. The system of claim 14, wherein the identity characteristic comprises a wavelength of invisible light present in the target.

28. The system of claim 14, wherein the identity characteristic comprises an intensity of invisible light present in the target.

29. The system of claim 14, wherein the identity characteristic comprises a shape of the target.

30. The system of claim 14, wherein the identity characteristic comprises a size of the target.

31. The system of claim 14, wherein the identity characteristic comprises a pulse pattern of the target.

32. The system of claim 14, further comprising at least one additional illuminator disposed on the object to project at least one additional target of invisible light, wherein the identity characteristic comprises a pattern of the targets.

33. The system of claim 14, further comprising at least one additional illuminator disposed on the object to project at least one additional target of invisible light, wherein the identity characteristic comprises a composition of shapes of the targets.

34. The system of claim 14, wherein the identity characteristic comprises a composite of characteristics of the target, wherein the characteristics are selected from the group consisting of wavelength, intensity, shape, size, pulse pattern, pattern in relation to other targets, and composition of shapes in relation to other targets.

35. The system of claim 1, further comprising:
a local display device viewable from within a first field-of-view that displays at least a subset of the visible component of the first video signal.

36. The system of claim 1, further comprising:
a communication subsystem that transmits at least a subset of the visible component of the first video signal to a remote terminal for display.

37. The system of claim 36, wherein the communication subsystem is configured to use a network selected from the group consisting of a cable television network and a direct broadcast satellite network.

38. The system of claim 37, further comprising:
a codec that receives television programming from the communication subsystem for display on a local display device viewable from within a first field-of-view, wherein the codec and a tracking subsystem are disposed within a common housing to form a set top box, and wherein the set top box transmits the first signal from the camera to the communication subsystem.

39. The system of claim 36, wherein the communication subsystem receives a second video signal from the remote terminal, the system further comprising:
a local display device that displays the second video signal.

40. The system of claim 39, wherein the second video signal and at least a subset of the visible component of the first video signal are displayed simultaneously.

41. A system for automatically identifying an object with a camera, the system comprising:
a camera, sensitive to invisible light, that captures a first video signal depicting the object having an invisible light illuminator disposed thereon to project a target of invisible light, the first video signal having visible and invisible components; and
an identification subsystem that processes the invisible component to determine the identity of the object without reference to the object's position or speed.

42. The system of claim 41, wherein the illuminator comprises a reflector, the system further comprising:
a stationary invisible light emitter that generates invisible light reflected by the reflector to project the target.

43. The system of claim 41, wherein the illuminator comprises a portable invisible light emitter that generates invisible light to project the target.

44. A method for automatically identifying an object with a camera, the method comprising:
projecting a target of invisible light with an invisible light illuminator disposed on the object to be identified;
capturing a first video signal depicting the object with a camera sensitive to invisible light, the first video signal having visible and invisible components; and
processing the invisible component to determine the identity of the object without reference to the object's position or speed.

45. The method of claim 44, wherein the illuminator comprises a reflector, the method further comprising:
generating invisible light with a stationary invisible light emitter, wherein the invisible light is reflected by the reflector to project the target.

46. The method of claim 44, wherein the illuminator comprises a portable invisible light emitter that generates invisible light to project the target.

47. The method of claim 44, wherein the invisible light comprises infrared light.

48. The method of claim 44, wherein the invisible light comprises ultraviolet light.

49. The method of claim 44, further comprising affixing the illuminator to the object to be identified with an adhesive disposed on a non-illuminating side of the illuminator, the illuminator further having an illuminating side.

50. The method of claim 44, wherein the object to be identified comprises a person engaged in video communication using the camera.

51. The method of claim 50, further comprising attaching the illuminator to an article worn by the person.

52. The method of claim 51, wherein the article is selected from the group consisting of a pair of glasses, a tie clip, and a piece of jewelry.

53. The method of claim 50, further comprising applying a coating directly to skin of the person, wherein the coating projects invisible light.

54. The method of claim 44, wherein the object to be identified is selected from the group consisting of a remote control device and a set of keys.

55. The method of claim 44, wherein capturing the first video signal comprises:
exposing a wide frequency image collection array to visible light and to the invisible light to generate the visible and invisible components of the first video signal.

56. The method of claim 44, wherein the camera comprises:
exposing a first image collection array to visible light to generate the visible component of the first video signal; and
exposing a second image collection array to invisible light to generate the invisible component of the first video signal.

57. The method of claim 44, wherein processing the invisible component comprises:
extracting an identity characteristic of the object from the invisible component.

58. The method of claim 57, wherein processing the invisible component comprises:
comparing the identity characteristic with a database to identify the object.

59. The method of claim 58, further comprising:
storing a plurality of identity characteristics in a database, wherein each of the identity characteristics corresponds to an identity of an object.

60. The method of claim 59, wherein storing the plurality of identity characteristics comprises:
receiving the identity characteristics and corresponding identifies from a user; and
storing the identity characteristic and corresponding identifies in the database.

61. The method of claim 60, further comprising:
storing at least one setting for each identity; and
commencing operation according to the setting in response to determination of the identity.

62. The method of claim 61, wherein the setting comprises an access level that defines circumstances under which the identity is able to control the method.

63. The method of claim 61, wherein the setting comprises a status level that defines circumstances under which a preference has priority over preferences of other identities.

64. The method of claim 61, wherein the setting comprises an entertainment preference that defines operation of entertainment hardware associated with the method.

65. The method of claim 61, wherein the setting comprises an environment preference that defines operation of environment control hardware associated with the method.

66. The method of claim 61, further comprising:
orienting a first field-of-view of the camera to center the target within the first field of view.

67. The method of claim 66, wherein the setting comprises a tracking preference that controls orientation of the first field-of-view.

68. The method of claim 61, wherein the camera has a first field-of-view with a magnification level, the method further comprising:
automatically adjusting the magnification level.

69. The method of claim 68, wherein the setting comprises a zooming preference that controls automatic adjustment of the magnification level.

70. The method of claim 57, wherein the identity characteristic comprises a wavelength of invisible light present in the target.

71. The method of claim 57, wherein the identity characteristic comprises an intensity of invisible light present in the target.

72. The method of claim 67, wherein the identity characteristic comprises a shape of the target.

73. The method of claim 57, wherein the identity characteristic comprises a size of the target.

74. The method of claim 57, wherein the identity characteristic comprises a pulse pattern of the target.

75. The method of claim 57, further comprising disposing at least one additional illuminator on the object to project at least one additional target of invisible light, wherein the identity characteristic comprises a pattern of the targets.

76. The method of claim 57, further comprising disposing at least one additional illuminator on the object to project at least one additional target of invisible light, wherein the identity characteristic comprises a composition of shapes of the targets.

77. The method of claim 57, wherein the identity characteristic comprises a composite of characteristics of the target, wherein the characteristics are selected from the group consisting of wavelength, intensity, shape, size, pulse pattern, pattern in relation to other targets, and composition of shapes in relation to other targets.

78. The method of claim 44, further comprising:
displaying at least a subset of the visible component of the first video signal at a location viewable from within a first field-of-view of the camera.

79. The method of claim 44, further comprising:
transmitting at least a subset of the visible component of the first video signal to a remote terminal for display.

80. The method of claim 79, wherein at least a subset of the visible component of the first video signal is transmitted through a network selected from the group consisting of a cable television network and a direct broadcast satellite network.

81. The method of claim 80, further comprising:
receiving television programming from the network for display at a location viewable from within a first field-of-view of the camera, wherein orienting the first field-of-view and receiving the television programming are performed within a set top box, and wherein the set top box transmits the first signal from the camera to the network.

82. The method of claim 79, further comprising:
receiving a second video signal from the remote terminal; and
displaying the second video signal on a local display device.

83. The method of claim 82, wherein the second video signal and at least a subset of the visible component of the first, video signal are displayed simultaneously.

84. A method for automatically identifying an object with a camera, the method comprising:
capturing a first video signal depicting the object with a camera sensitive to invisible light, the object having an illuminator disposed thereon to project a target of invisible light, the first video signal having visible and invisible components; and
processing the invisible component to determine the identity of the object without reference to the object's position or speed.

85. The method of claim 84, wherein the illuminator comprises a reflector, the method further comprising:
generating invisible light with a stationary invisible light emitter, wherein the invisible light is reflected by the reflector to project the target.

86. The method of claim 84, wherein the illuminator comprises a portable invisible light emitter that generates invisible light to project the target.

87. A system for automatically tracking an object with a camera, the system comprising:
means for illuminating, disposed on an object to be tracked, for projecting at least one target of invisible light;
a camera, sensitive to invisible light, that captures a first video signal depicting the object, the first video signal having visible and invisible components; and
means for processing the invisible component to determine the identity of the object based on one or more of a number, pattern, wavelength, and pulse frequency of the at least one target of invisible light.

\* \* \* \* \*